United States Patent
Kondiles et al.

(10) Patent No.: US 11,586,647 B2
(45) Date of Patent: Feb. 21, 2023

(54) RANDOMIZED DATA DISTRIBUTION IN HIGHLY PARALLEL DATABASE MANAGEMENT SYSTEM

(71) Applicant: OCIENT LLC, Chicago, IL (US)

(72) Inventors: George Kondiles, Chicago, IL (US); Rhett Colin Starr, Long Grove, IL (US); Joseph Jablonski, Chicago, IL (US)

(73) Assignee: OCIENT, INC., Chicago, IL (US)

( * ) Notice: Subject to any disclaimer, the term of this patent is extended or adjusted under 35 U.S.C. 154(b) by 751 days.

(21) Appl. No.: 15/722,900

(22) Filed: Oct. 2, 2017

(65) Prior Publication Data

US 2018/0096048 A1    Apr. 5, 2018

Related U.S. Application Data

(60) Provisional application No. 62/403,328, filed on Oct. 3, 2016, provisional application No. 62/403,231, filed on Oct. 3, 2016.

(51) Int. Cl.
*G06F 16/00* (2019.01)
*G06F 16/27* (2019.01)
(Continued)

(52) U.S. Cl.
CPC .......... *G06F 16/27* (2019.01); *G06F 12/0238* (2013.01); *G06F 13/1673* (2013.01); *G06F 13/28* (2013.01); *G06F 13/4282* (2013.01); *G06F 15/17331* (2013.01); *G06F 16/22* (2019.01); *G06F 16/2358* (2019.01);
(Continued)

(58) Field of Classification Search
CPC .......... H03M 13/1154; H03M 13/118; H03M 13/1185; H03M 13/2906; H03M 13/271; G06F 16/20–22; G06F 16/221; G06F 16/2255; G06F 16/2246; G06F 16/285; G06F 16/316; G06F 16/319; G06F 16/2471; G06F 16/27; G06F 16/217; G06F 16/2453; G06F 16/283; G06F 7/582; G06F 7/58;
(Continued)

(56) References Cited

U.S. PATENT DOCUMENTS 5,548,770 A    8/1996  Bridges
5,634,011 A    5/1997  Auerbach et al.
(Continued)

OTHER PUBLICATIONS

Steven Berson et al.," Randomized Data Allocation for Real-Time Disk Uo", Compcon '96. Technologies for the Information Superhighway Digest of Papers, Feb. 25-28, 1996,pp. 286-290.*
(Continued)

*Primary Examiner* — Srirama Channavajjala
(74) *Attorney, Agent, or Firm* — Garlick & Markison; Timothy W. Markison; Timothy D. Taylor

(57) ABSTRACT

A massively parallel database management system includes an index store and a payload store including a set of storage systems of different temperatures. Both the index store and the storage system each include a list of clusters. Each cluster includes a set of nodes with storage devices forming a group of segments. Nodes and clusters are connected over high speed links. Each cluster receives data and splits the data into data rows based on a predetermined size. The data rows are randomly and evenly distributed between all nodes of the cluster.

6 Claims, 21 Drawing Sheets

(51) Int. Cl.
*G06F 16/22* (2019.01)
*G06F 16/25* (2019.01)
*G06F 16/28* (2019.01)
*G06F 16/23* (2019.01)
*H04L 67/568* (2022.01)
*G06F 15/173* (2006.01)
*H04L 67/1097* (2022.01)
*G06F 12/02* (2006.01)
*G06F 13/16* (2006.01)
*G06F 13/28* (2006.01)
*G06F 13/42* (2006.01)
*G06F 3/06* (2006.01)

(52) U.S. Cl.
CPC .......... *G06F 16/2365* (2019.01); *G06F 16/25* (2019.01); *G06F 16/285* (2019.01); *H04L 67/1097* (2013.01); *H04L 67/568* (2022.05); *G06F 3/067* (2013.01); *G06F 3/0656* (2013.01); *G06F 2212/202* (2013.01); *G06F 2213/0026* (2013.01); *G06F 2213/0032* (2013.01)

(58) Field of Classification Search
CPC ... G06F 16/25; G06F 16/2358; G06F 16/2365
See application file for complete search history.

(56) References Cited

U.S. PATENT DOCUMENTS

| | | | |
|---|---|---|---|
| 6,230,200 B1 | 5/2001 | Forecast | |
| 6,374,336 B1* | 4/2002 | Peters | G06F 11/1076 711/167 |
| 6,633,772 B2 | 10/2003 | Ford et al. | |
| 7,177,951 B1 | 2/2007 | Dykeman et al. | |
| 7,496,589 B1* | 2/2009 | Jain | H03M 7/30 |
| 7,499,907 B2 | 3/2009 | Brown et al. | |
| 7,908,242 B1 | 3/2011 | Achanta | |
| 7,990,797 B2 | 8/2011 | Moshayedi et al. | |
| 8,965,921 B2* | 2/2015 | Gajic | G06F 16/21 707/770 |
| 9,081,855 B1* | 7/2015 | Abeloe | G06F 16/7837 |
| 2001/0051949 A1 | 12/2001 | Carey | |
| 2002/0010739 A1 | 1/2002 | Ferris et al. | |
| 2002/0032676 A1 | 3/2002 | Reiner et al. | |
| 2004/0162853 A1 | 8/2004 | Brodersen et al. | |
| 2005/0160073 A1* | 7/2005 | Bernhardt | G06F 16/2465 |
| 2006/0037075 A1 | 2/2006 | Frattura et al. | |
| 2006/0090095 A1* | 4/2006 | Massa | G06F 11/1479 714/4.11 |
| 2006/0107135 A1* | 5/2006 | Corbett | G06F 11/1076 714/718 |
| 2006/0268742 A1 | 11/2006 | Chu et al. | |
| 2008/0133456 A1 | 6/2008 | Richards | |
| 2008/0222480 A1* | 9/2008 | Huang | H03M 13/1191 714/752 |
| 2009/0063893 A1 | 3/2009 | Bagepalli | |
| 2009/0172191 A1 | 7/2009 | Dumitriu et al. | |
| 2009/0183167 A1 | 7/2009 | Kupferschmidt | |
| 2009/0265305 A1* | 10/2009 | Barsness | G06F 16/2471 |
| 2010/0061557 A1* | 3/2010 | Youn | H04L 9/083 380/279 |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219020 A1* | 9/2011 | Oks | G06F 16/221 707/769 |
| 2011/0219169 A1 | 9/2011 | Zhang | |
| 2011/0320417 A1* | 12/2011 | Luo | G06F 16/22 707/693 |
| 2012/0036146 A1* | 2/2012 | Annapragada | G06F 16/2471 707/764 |
| 2012/0109888 A1 | 5/2012 | Zhang et al. | |
| 2012/0151118 A1 | 6/2012 | Flynn | |
| 2012/0185866 A1 | 7/2012 | Couvee | |
| 2012/0254252 A1 | 10/2012 | Jin | |
| 2012/0311246 A1 | 12/2012 | McWilliams | |
| 2013/0166502 A1* | 6/2013 | Walkauskas | G06F 16/285 707/610 |
| 2013/0166556 A1* | 6/2013 | Baeumges | G06F 16/285 707/737 |
| 2013/0238630 A1* | 9/2013 | Dhuse | G06F 11/10 707/741 |
| 2013/0332484 A1 | 12/2013 | Gajic | |
| 2014/0047095 A1 | 2/2014 | Breternitz et al. | |
| 2014/0136510 A1 | 5/2014 | Parkkinen | |
| 2014/0188841 A1 | 7/2014 | Sun et al. | |
| 2014/0244785 A1* | 8/2014 | Potlapally | H04L 9/0869 709/217 |
| 2015/0039712 A1 | 2/2015 | Frank et al. | |
| 2015/0088899 A1* | 3/2015 | Hoffert | G06F 16/2228 707/741 |
| 2015/0205607 A1 | 7/2015 | Lindholm | |
| 2015/0244804 A1 | 8/2015 | Warfield et al. | |
| 2015/0248366 A1 | 9/2015 | Bergsten et al. | |
| 2015/0293966 A1 | 10/2015 | Cai et al. | |
| 2015/0310045 A1 | 10/2015 | Konik | |
| 2016/0034547 A1 | 2/2016 | Lerios | |
| 2016/0048577 A1* | 2/2016 | Hall | G06F 16/284 707/737 |

OTHER PUBLICATIONS

Storage of Structured Data: BigTable and HBase, New Trends In Distributed Systems, MSc Software and Systems, Distributed Systems Laboratory.
A new high performance fabric for HPC, Michael Feldman, May 2016, Intersect360 Research.
Amazon DynamoDB: ten things you really should know, Nov. 13, 2015, Chandan Patra, http://cloudacademy.com/blog/amazon-dynamodb-ten-thing.
Step 2: Examine the data model and implementation details, 2016, Amazon Web Services, Inc., http://docs.aws.amazon.com/amazondynamodb/latest/developerguide/Ti . . . .
Distributed Systems, Fall 2012, Mohsen Taheriyan, http://www-scf.usc.edu/~csci572/2011Spring/presentations/Taheriyan.pptx.
Bigtable, a NoSQL massively parallel table, Paul Krzyzanowski, Nov. 2011, https://www.cs.rutgers.edu/~pxk/417/notes/content/bigtable.html.
B-Trees.
Remote Direct Memory Access Transport for Remote Procedure Call, Internet Engineering Task Force (IETF), T. Talpey, Request for Comments: 5666, Category: Standards Track, ISSN: 2070-1721, Jan. 2010.
An Inside Look at Google BigQuery, by Kazunori Sato, Solutions Architect, Cloud Solutions team, Google Inc., 2012.
MapReduce: Simplied Data Processing on Large Clusters, OSDI 2004, Jeffrey Dean and Sanjay Ghemawat, Google, Inc.
Optimal Routing in Binomial Graph Networks, Thara Angskun et al, 1Department of Computer Science, The University of Tennessee, Knoxville, University of Tennessee, Oak Ridge National Laboratory and University of Manchester {angskun, bosilca, bvz, dongarra}@cs.utk.edu.
Self-Healing in Binomial Graph Networks, Thara Angskun et al, Deparlment of Computer Science, The University of Tennessee, Knoxville, USA.
Alechina, N. (2006-2007). B-Trees. School of Computer Science, University of Nottingham, http://www.cs.nott.ac.uk/~psznza/G5BADS06/lecture13-print.pdf 41 pages.
Angskun T., Bosilca G., Dongarra J. (2007) Self-healing in Binomial Graph Networks. In: Meersman R., Tari Z., Herrero P. (eds) On the Move to Meaningful Internet Systems 2007: OTM 2007 Workshops. OTM 2007. Lecture Notes in Computer Science, vol. 4806. Springer, Berlin, Heidelberg.
International Searching Authority; International Search Report and Written Opinion; International Application No. PCT/US2017/054784; dated Dec. 28, 2017; 10 pgs.

(56) References Cited

OTHER PUBLICATIONS

Rodero-Merino, L.; Storage of Structured Data: Big Table and HBase, New Trends In Distributed Systems, MSc Software and Systems, Distributed Systems Laboratory; Oct. 17, 2012; 24 pages.
T. Angskun, G. Bosilca, B. V. Zanden and J. Dongarra, "Optimal Routing in Binomial Graph Networks," Eighth International Conference on Parallel and Distributed Computing, Applications and Technologies (PDCAT 2007), Adelaide, SA, 2007, pp. 363-370.
International Searching Authority; International Search Repod and Written Opinion; International Application No. PCT/US2017/054773; dated Feb. 13, 2018; 17 pgs.
International Searching Authority; International Search Report and Written Opinion; International Application No. PCT/US2017/066145; dated Mar. 5, 2018; 13 pgs.
International Searching Authority; International Search Report and Written Opinion; International Application No. PCT/US2017/066169; dated Mar. 6, 2018; 15 pgs.
International Searching Authority; International Search Report and Written Opinion; International Application No. PCT/US2018/025729; dated Jun. 27, 2018; 9 pgs.
International Searching Authority; International Search Report and Written Opinion; International Application No. PCT/US2018/034859; dated Oct. 30, 2018; 8 pgs.

* cited by examiner

| row keys | column family language: | column family contents: | column family anchor:cnnsi.com: | column family anchor:mylook.ca: |
|---|---|---|---|---|
| com.abc.www | EN | <!DOCTYPE HTML PUBLIC... | | |
| com.cnn.www | EN | <!DOCTYPE HTML PUBLIC... | CNN | CNN.COM |
| com.cnn.www/money | EN | <!DOCTYPE HTML PUBLIC... | | |
| com.espn.www | EN | <!DOCTYPE HTML PUBLIC... | | |

200

Sorted Rows →

FIG. 2

Prior art

RANDOMIZED DATA DISTRIBUTION IN HIGHLY PARALLEL DATABASE MANAGEMENT SYSTEM

CROSS REFERENCE TO RELATED APPLICATIONS

This application claims the benefit and priority of U.S. Patent Application No. 62/403,231, entitled "HIGHLY PARALLEL DATABASE MANAGEMENT SYSTEM," filed Oct. 3, 2016, which is hereby incorporated by reference in its entirety. This application also claims the benefit and priority of United States Patent Application No. 62/403,328, entitled "APPLICATION DIRECT ACCESS TO NETWORK RDMA MEMORY," filed Oct. 3, 2016, which is hereby incorporated by reference in its entirety. This application is related to U.S. patent application Ser. No. 15/722,968, entitled "DATA TRANSITION IN HIGHLY PARALLEL DATABASE MANAGEMENT SYSTEM," filed Oct. 2, 2017, which is hereby incorporated by reference in its entirety. This application is related to U.S. patent application Ser. No. 15/722,687, entitled "DATABASE SYSTEM UTILIZING FORCED MEMORY ALIGNED ACCESSES," filed Oct. 2, 2017, which is hereby incorporated by reference in its entirety. This application is also related to U.S. patent application Ser. No. 15/722,794, entitled "APPLICATION DIRECT ACCESS TO SATA DRIVE," filed Oct. 2, 2017, which is hereby incorporated by reference in its entirety.

FIELD OF THE DISCLOSURE

The present invention generally relates to a system and method for organizing and managing large volume of data, and more particularly relates to a massively parallel database management system with minimum latency. More particularly still, the present disclosure relates to a massively parallel database management system that is highly optimized for managing a large volume of data with high read-write ratio.

DESCRIPTION OF BACKGROUND

With rapid development and widespread utilization of technologies in the last few decades, a large volume of digital data is generated on a daily basis. Organizing and managing such amounts of data have promoted the development of database technologies. Relational database management systems ("RDBMS"), such as Oracle Database Management System, Microsoft SQL Database Management System and MySQL Database Management System, have thus been proposed and gained broad acceptance for data management. Relational database management systems focus on writing operations (also referred to herein as writes), such as record update and deletion, as much as they focus on reading operations (also referred to herein as reads). These systems rely on primary keys of each data table to generate indexes for database search.

However, relational database management systems, and other types of traditional database systems, no longer meet the demands of certain users as Internet and other technologies produce and consume dramatically more data in recent years. In particular, larger and larger amount of data are generated as each day goes by. The amount of data is now measured in Gigabytes (GBs), Terabytes (TBs), Petabytes (PBs) and even Exabytes (EBs). Internet tweets, healthcare data, factory data, financial data and Internet router logs are examples of large quantity data. In addition, trillions of rows of data are regularly produced by machines, such as sensors, cameras, etc. Oftentimes, these data are frequently read, but rarely written (such as update and deletion). Alternatively, it can be said that such data is rarely mutated and has a low mutation rate. The ratio between the number of time that a piece of data is read and the number of times it is written can reach the level of, for example, one million to one or even higher.

Accordingly, a database system managing these types of large data volumes needs to optimize read operations over write operations. For example, the new database system needs to handle millions and even billions of read queries per second. Furthermore, such a new type of database system needs to provide an acceptable minimum latency in searching an extremely large data base, reading a piece of desired data, and providing it to computer software applications and users. Traditional database management systems cannot meet such a demand.

Various new databases have been proposed to meet progressively larger amounts of data. For example, Google Inc. has developed Bigtable data storage system built on Google File System and other Google technologies. Bigtable is not a relational database system. Instead, it is a sparse and distributed multi-dimensional sorted map that is indexed by a row key, column keys and a timestamp. In Bigtable, row keys in a table are arbitrary strings; and column keys are grouped into column families as shown in FIGS. 1 and 2. Amazon.com, Inc. has developed a similar database system—Amazon DynamoDB. DynamoDB is a NoSQL database that is also not a relational database. DynamoDB uses tables, items and attributes in its data modeling. Furthermore, DynamoDB requires unique primary keys, such as unique attributes, hash values, and hash and range values. DynamoDB also implements Local Secondary Index and Global Secondary Index. These efforts still fall short for the new challenges. For example, Bigtable and DynamoDB are not optimized for data with extremely high read-write ratios, are sparse and thus not storage efficient, still rely on conventional infrastructure, and cannot directly access storage devices for optimal performance.

Accordingly, there is a need for a new database management system that manages large amounts of data, is highly optimized for data with a low mutation rate, achieves minimum latency with a massively parallel architecture and mechanism, and reduces storage cost.

OBJECTS OF THE DISCLOSED SYSTEM, METHOD, AND APPARATUS

Accordingly, it is an object of this disclosure to provide a database management system for managing large volumes of data with low latency.

Another object of this disclosure is to provide a database management system that is massively parallel in both read and write operations.

Another object of this disclosure is to provide a massively parallel database management system accessible over the Internet.

Another object of this disclosure is to provide a massively parallel database management system with a payload store and an index store.

Another object of this disclosure is to provide a massively parallel database management system with payload and index stores having clusters of nodes.

Another object of this disclosure is to provide a massively parallel database management system with a payload store with clusters of different temperatures.

Another object of this disclosure is to provide a massively parallel database management system with different types of storage devices for different temperatures.

Another object of this disclosure is to provide a massively parallel database management system performing data transitions between different temperatures of storage systems.

Another object of this disclosure is to provide a massively parallel database management system performing data transitions between different temperatures of storage systems based on data life.

Another object of this disclosure is to provide a massively parallel database management system performing data transitions between different temperatures of storage systems based on a least recently read policy.

Another object of this disclosure is to provide a massively parallel database management system with payload and index stores having their clusters and nodes interconnected over high speed links.

Another object of this disclosure is to provide a massively parallel database management system with payload and index stores having their clusters and nodes interconnected over high speed links supporting RDMA.

Another object of this disclosure is to provide a massively parallel database management system with clusters having equal number of nodes.

Another object of this disclosure is to provide a massively parallel database management system with clusters having equal number of storage drives.

Another object of this disclosure is to provide a massively parallel database management system with clusters maintaining segment and storage disk drive maps.

Another object of this disclosure is to provide a massively parallel database management system with clusters supporting parity for redundancy and fault tolerance.

Another object of this disclosure is to provide a massively parallel database management system with clusters supporting XOR encoding for redundancy and fault tolerance.

Another object of this disclosure is to provide a massively parallel database management system with clusters supporting P+Q encoding for redundancy and fault tolerance.

Another object of this disclosure is to provide a massively parallel database management system with clusters supporting Reed-Solomon encoding for redundancy and fault tolerance.

Another object of this disclosure is to provide a massively parallel database management system fitting rows of data into coding blocks that align on page boundaries.

Another object of this disclosure is to provide a massively parallel database management system packing rows of data into coding blocks sequentially.

Another object of this disclosure is to provide a massively parallel database management system randomly distributing filled coding blocks between segments.

Another object of this disclosure is to provide a massively parallel database management system writing coding blocks into segments sequentially.

Another object of this disclosure is to provide a massively parallel database management system identifying rows of data by unique row numbers.

Another object of this disclosure is to provide a massively parallel database management system identifying rows of data by row numbers that uniquely locate rows within the database system.

Another object of this disclosure is to provide a massively parallel database management system implementing row numbers identifying segment group, IDA offset, segment offset and row offset.

Another object of this disclosure is to provide a massively parallel database management system with data storage software applications directly associated with low level storage device drivers without relying on file systems.

Another object of this disclosure is to provide a massively parallel database management system running data storage software applications and storage device drivers in user mode.

Another object of this disclosure is to provide a massively parallel database management system with data storage software applications associated and storage device drivers that directly access storage devices.

Another object of this disclosure is to provide a massively parallel database management system with storage device drivers programmed in computer program language C++ for optimal performance.

Another object of this disclosure is to provide a massively parallel database management system with an index structure.

Another object of this disclosure is to provide a massively parallel database management system with an index structure having row numbers located in leaves.

Another object of this disclosure is to provide a massively parallel database management system with index leaves stored in low endurance storage devices and index values stored in high endurance storage devices.

Another object of this disclosure is to provide a massively parallel database management system with index leaves stored in low endurance storage devices and grouped by segments.

Another object of this disclosure is to provide a massively parallel database management system to perform parallel writes across different Solid State Drives.

Another object of this disclosure is to provide a massively parallel database management system to perform parallel writes across different NVRAMs.

Another object of this disclosure is to provide a massively parallel database management system to perform parallel writes on individual Solid State Drives.

Another object of this disclosure is to provide a massively parallel database management system to perform parallel writes on individual NVRAMs.

Another object of this disclosure is to provide a massively parallel database management system to perform parallel reads across different Solid State Drives.

Another object of this disclosure is to provide a massively parallel database management system to perform parallel reads across different NVRAMs.

Another object of this disclosure is to provide a massively parallel database management system to perform parallel reads on individual Solid State Drives.

Another object of this disclosure is to provide a massively parallel database management system to perform parallel reads on individual NVRAMs.

Another object of this disclosure is to provide a massively parallel database management system that minimizes rewrites on solid state drives (SSDs) to allow low cost and low endurance NAND flash drives to be used to store large volume of data.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a massively parallel database management system for managing a massive volume of data. The database management system includes a database system including a payload store and an index store, each of which includes a set of clusters interconnected over high speed links. Each cluster includes a set of nodes, each of which includes one or more storage disk drives. As used herein, storage disks are storage disk drives are also referred as storage devices. The set of nodes implement redundancy and fault tolerance schemes. Each cluster has high-speed interconnections via, for example, switches. The high-speed links support Remote Direct Memory Access. The payload store includes clusters of different storage temperatures. Different types of storage devices are utilized for different temperatures based on factors, such as endurance and cost. Accordingly, temperature is also interchangeably referred to herein as IOP Density Capability. Depending on one or more criteria, data in one temperature is transitioned to another temperature. The transition follows a three-step commit process.

The index store manages indexes, while the payload store stores data. The indexes are maintained in an index structure, such as a B+ tree. Leaves of the index structure store row numbers of rows of data. Data in the leaves is sorted by segment when stored in low endurance storage devices. Index values are stored in high endurance devices as they can be written more often.

The database system manages data in rows and can handle, for example, quadrillions of rows. The rows of data can be of fixed size. Rows are packed into coding blocks. Coding blocks have the same size as, or are a multiple of, the page size for the particular drives used by the storage nodes. Each coding block thus includes multiple rows and a header. Coding blocks are written into storage disk drives of nodes within clusters on page boundaries. Database software applications running in clusters and on nodes within clusters maintain open coding blocks in memory. Each open coding block is an ordered unit of storage, belonging to a segment, and the opening of one such block is performed after the closing of the previous block. Each segment is a fixed-size portion of a storage drive in a node. When one or more open coding blocks are filled, they are flushed to their associated storage drives. Accordingly, rows of data are sequentially written into coding blocks; and coding blocks are sequentially written into segments on each node. Further, the database system achieves a higher level of utilization of storage drives, and thus reduces cost.

The open coding block memory can be pinned memory buffers that are accessible via Remote Direct Memory Access by networking interfaces and other nodes within the database system. The database system generates a row number for each row. The row number includes a segment group identifier, an IDA offset, a segment offset and a row offset for uniquely locating the row of data in a node disk drive. Database software applications are associated with low level storage device drivers to bypass file systems. The direct association allows the applications to communicate with the drivers for directly read data from and write data into particular physical locations of storage disk drives. The direct access to the drives improves performance of the system. Furthermore, the drivers are coded using a computer programming language such as, for example, C++ for even better performance in reading and writing data.

In addition to a storage device, each node within the payload store also includes a processing unit, a memory operatively coupled to the processing unit, and a network interface operatively coupled to the processing unit. The storage device is operatively coupled to the processing unit for storing data. The payload store includes a first cluster having a first node and a first set of nodes. The first node runs a first computer software application that is adapted to receive a data for storing into the first cluster; split the data into a set of data rows; and randomly distribute the set of data rows between the first set of nodes. Each data row within the set of data rows is randomly assigned to a node within the first set of nodes. The node is adapted to write the data row into the storage device of the node. The first computer software application is further adapted to first compress the data before splitting the compressed data into the set of data rows. The set of data rows consists of a subset of data rows and a last data row. The subset of data rows have a same size and the last data row has a size that is same as or smaller than the same size.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a prior art database data model.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
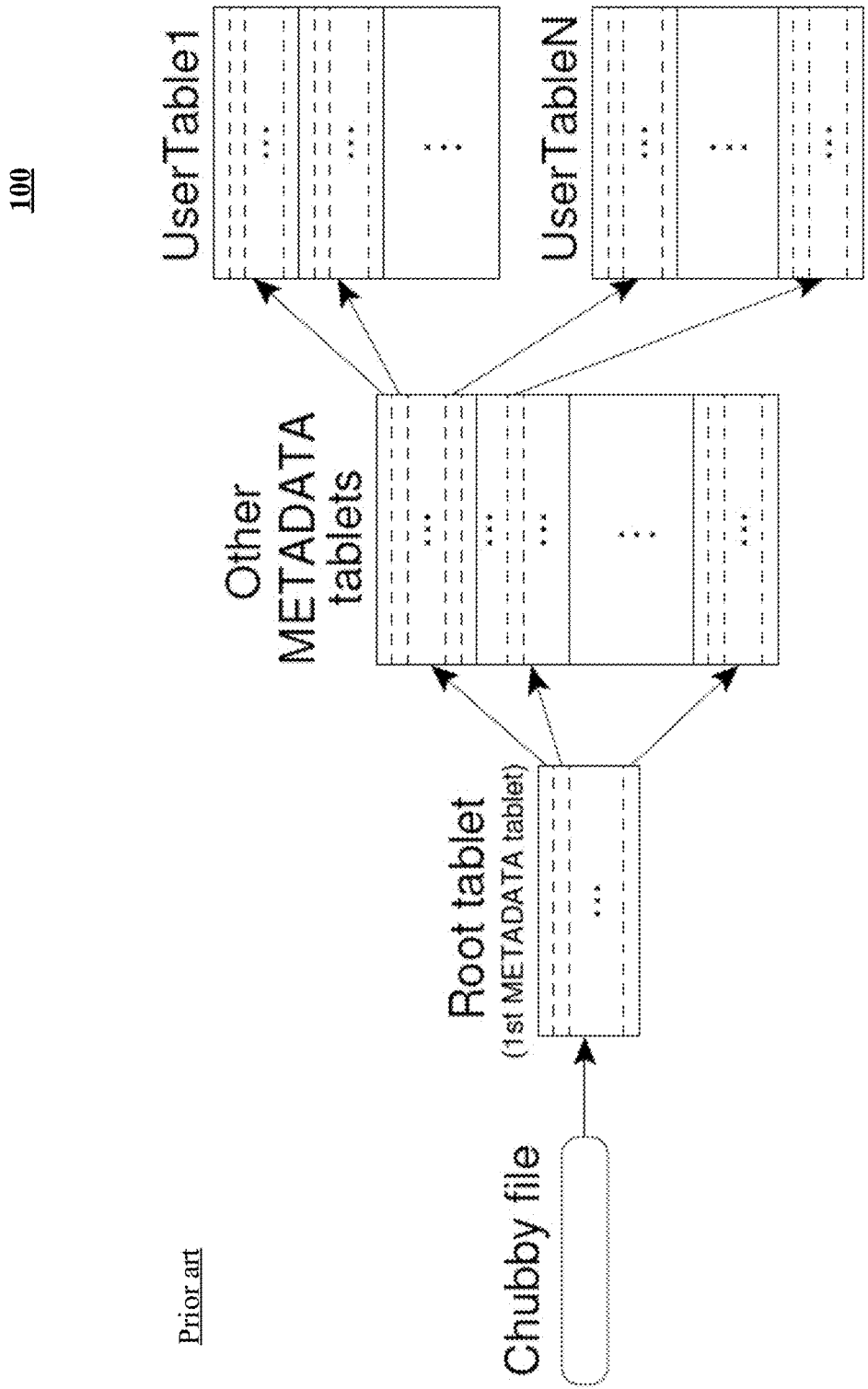
FIG. 1 is a prior art database architecture.
Figure 3:
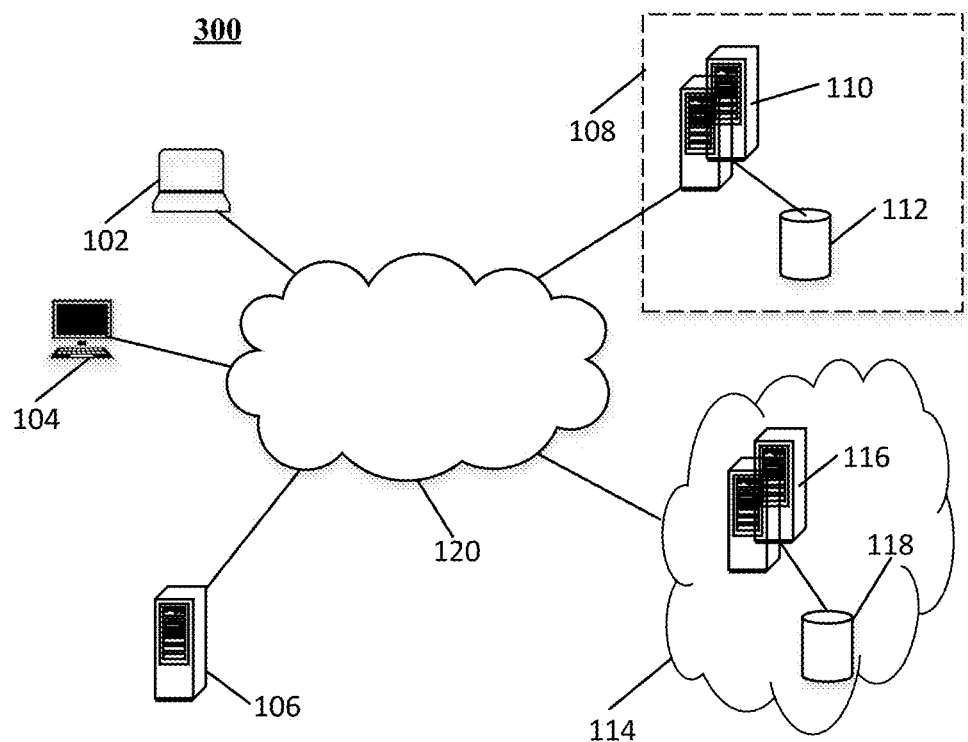
FIG. 3 is a communication system with a database management system for managing a large volume of data in accordance with the teachings of this disclosure.

Turning to the Figures and to FIG. 3 in particular, a communication system for managing and serving a large volume of data is shown and generally indicated at 300. The illustrative system 300 includes a client computer 102, a client computer 104, a third party server system 106, and a database management system 108. The client computers 102-104 and the third party server 106 communicates with the database management system 108 over a wide network 120, such as the Internet. The database management system 108 includes a database server 110 and database system 112. The database server 110 interfaces with the client computers 102-104 and the third party server 106, and interacts with the database system 112. For example, the client computer104 and/or the server 106 accesses the database server 110 to request data stored in the database system 112. The requested data is read from the database system 112 and returned to the data requestor. The database server 110 can also be requested to delete or update data stored in the database system 112. In an alternate embodiment, the data server 110 is an element of the database system 112.

As an additional example, the client computer 104 and/or the server 106 uploads data to the database server 110 for storing the data into the database system 112. In one implementation, the database management system 108 is a standalone system or a server farm system. Alternatively, it is implemented as a cloud system, such as the cloud based database management system indicated at 114. The cloud based database management system 114 includes a cloud server 116 performing the functions of the server 110, and a cloud database system 118 performing the functions of the database system 112. Hereinafter, the servers 110 and 116 are collectively referred to as database server 110, and the database systems 112 and 118 are collectively referred to as database system 112.

Figure 4:
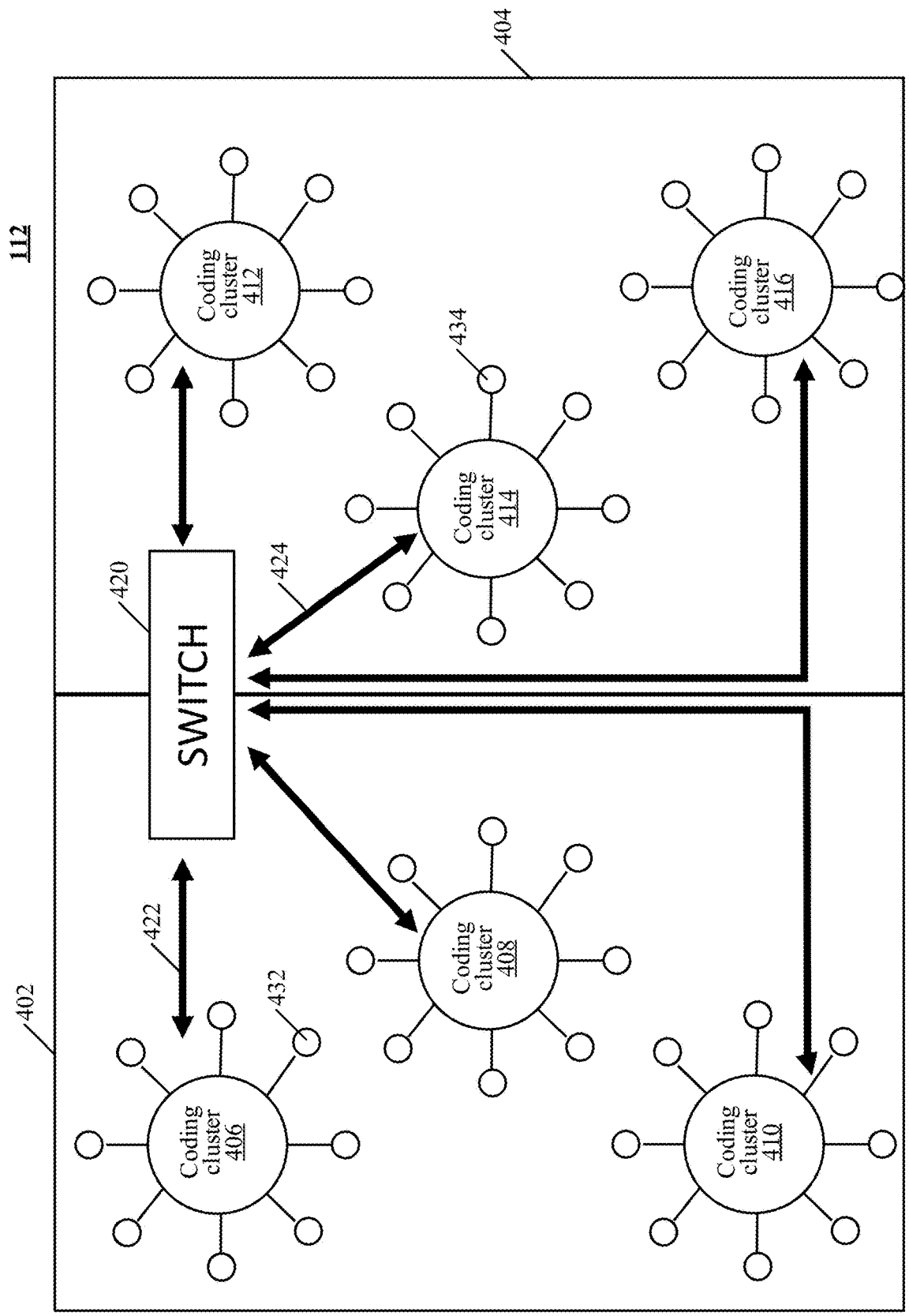
FIG. 4 is a simplified block diagram illustrating a database system in accordance with this disclosure.

The database system 112 is further illustrated by reference to FIGS. 4 and 5. Turing first to FIG. 4, a simplified block diagram illustrating the database system 112 is shown. The database system 112 includes a payload store 402 for storing and serving data and an index store 404 for storing and managing indexes for accessing the data stored payload store 402. The payload store 402 includes a set of coding clusters 406, 408 and 410 for storing data and serving data to computer software applications, such as applications running on the computers 102-106.

Each coding cluster includes a number of nodes, such as the nodes 432 and 434. In one implementation, the coding clusters each have the same number of nodes. For example, the number of nodes is five (5) in each cluster. Each node includes one or more storage devices, such as Non-Volatile Memory Express (NVME) and Serial Advanced Technology Attachment (SATA) storage devices. Nodes within a coding cluster are connected through high speed links. In other words, each cluster has local high-speed-interconnect (HSI), such as Infiniband, via a switch. The clusters are connected to each other through a switch 420 via high speed links, such as the links 422 and 424. The links between the clusters are high-speed-interconnect, such as Infiniband.

Figure 18:
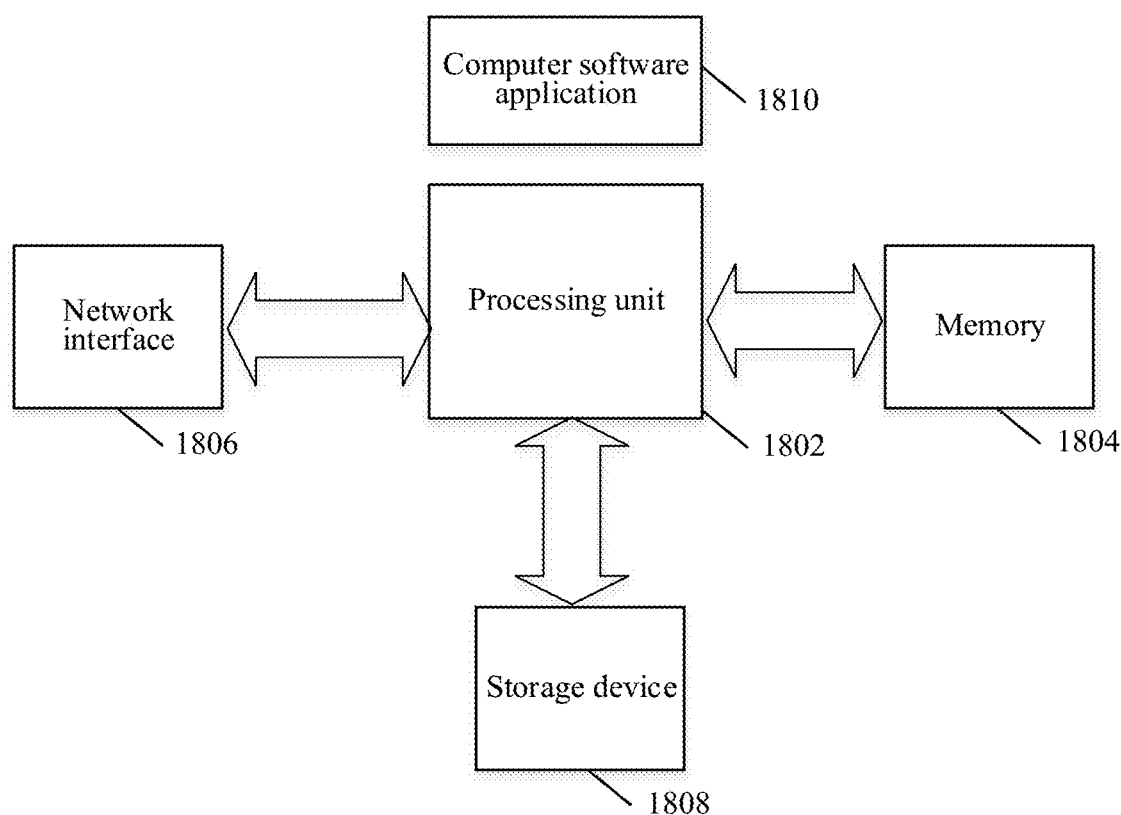
FIG. 18 is a simplified diagram of a computer for use with the teachings of this disclosure.

Each node is a computer system, a simplified diagram of which is shown in FIG. 18 and generally indicated at 1800. The computer 1800 includes a processing unit 1802, a network interface 1806 operatively coupled to the processing unit 1802, some amount of memory (such as DRAM) 1804 accessed by the processing unit 1802, a storage device 1808 operatively coupled to the processing unit 1802, and a computer software application 1810 running on the processing unit 1802. To obtain the maximum performance in one implementation, the computer software application 1810 is coded in a high performance computer programming language, such as C++.

Figure 5:
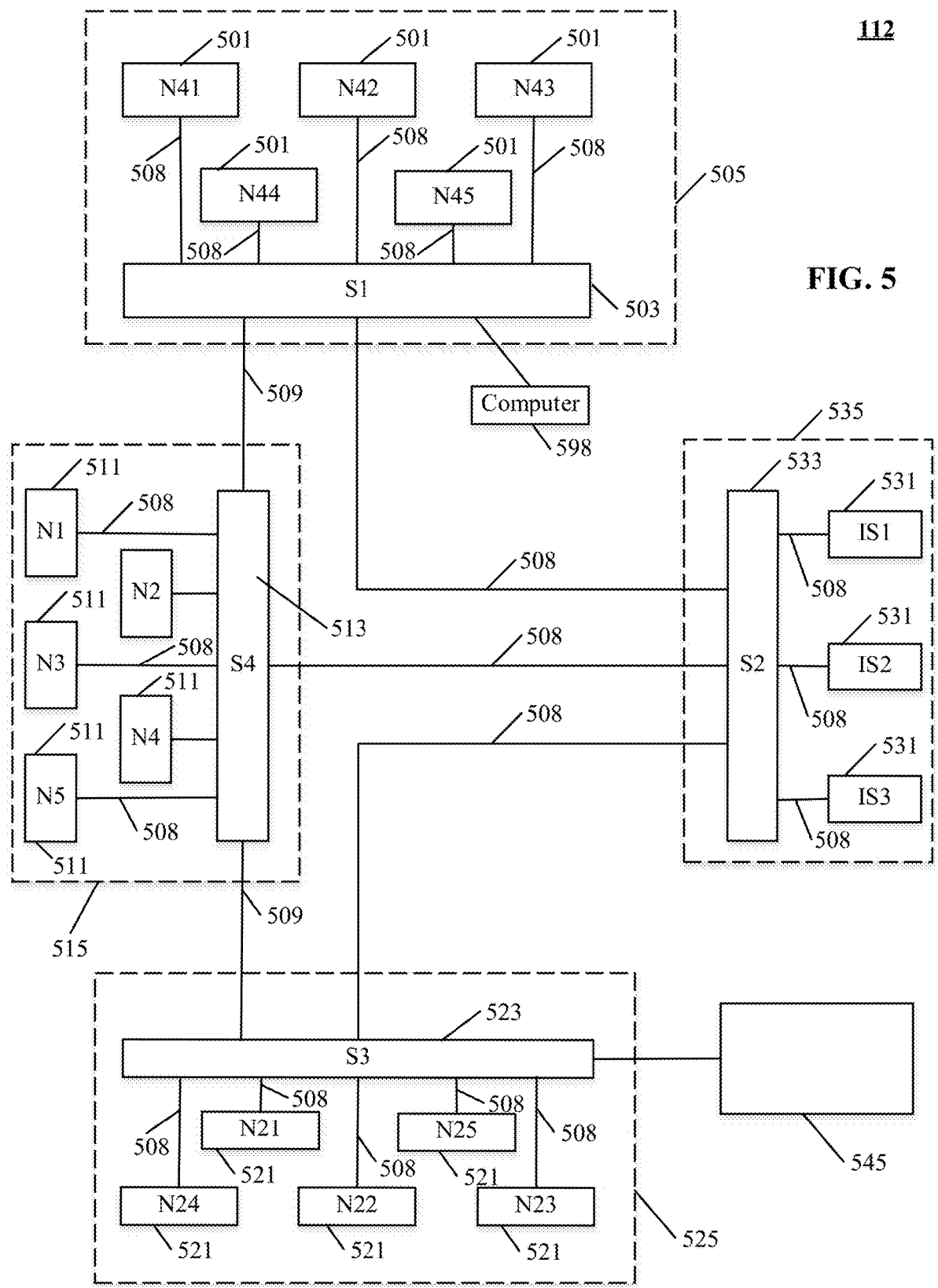
FIG. 5 is a simplified block diagram illustrating a high performance database system constructed in accordance with this disclosure.

Referring now to FIG. 5, an illustrative embodiment of the high performance database system 112 is shown. Three coding clusters of the payload store 402 are indicated at 505, 515 and 525 respectively. A coding cluster of the index store 404 is indicated at 535. In the illustrative database system 112, the clusters 505, 515 and 525 each include exactly five nodes indicated at 501, 511 and 521 respectively in the illustrative embodiment. The cluster 505 is a blazing storage cluster; the cluster 515 is a hot storage cluster; and the cluster 525 is a warm storage cluster. In a further implementation, the database system 112 includes or communicates with a cold cluster 545. As used herein, blazing, hot, warn and cold indicate data temperature that corresponds to the expected access rate of the data. For example, the age of the data is measured in days in a system where newer data is expected to be accessed more frequently. For instance, blazing indicates that data is less than X days old, hot indicates that data is less than Y days old and older than data in blazing clusters, warm indicates that data is less than Z days old and older than data in hot clusters, and cold indicates that data is at least Z days old. Z is bigger than Y while Y is bigger than X. For example, X is seven; Y is twenty one; and Z is forty two. The age can also be measured in seconds, minutes and hours.

The links 508 and 509 are capable of remote direct memory access (RDMA). In particular, the index cluster 535 is connected to the storage clusters 505,515,525 by high speed, RDMA capable links 508. On the other hand, the storage clusters 505,515,525 are connected to one another by standard (non-RDMA capable) high performance network links 509, such as 100 Gbps Ethernet. Nodes within a cluster are linked using HSI 508, such as Infiniband or iWarp Ethernet. Switches 503, 513, 523 and 533 interconnect the clusters 505, 515, 525 and 535 over HSI 509, such as 100 GB Ethernet. As used herein, links between clusters are termed as inter-cluster links while links between nodes within a cluster are termed as intra-cluster links. As discussed above, Infiniband, iWARP Ethernet, RoCE Ethernet and Omnipath are examples of high speed, RDMA capable links. Importantly, such links allow different nodes in each cluster to exchange information rapidly; as discussed above, information from one node is inserted into the memory of another node without consuming processor cycles on either node.

The blazing storage node 501 may include, for example, an array of Non-Volatile Dual Inline Memory Module (NVDIMM) storage, such as that marketed by Hewlett Packard Enterprise, or any other extremely fast storage, along with appropriate controllers to allow for full speed access to such storage. In one implementation, the storage is Apache Pass NVRAM storage. The hot storage node 511 may include, for example, one or more Solid State NVME drives, along with appropriate controllers to allow for full speed access to such storage. The warm storage node 521 may include, for example, one or more Solid State SATA drives, along with appropriate controllers to allow for full speed access to such storage.

Each index node 531 will also include storage, which will generally comprise high performance storage such as Solid State SATA drives or higher performance storage devices. Generally, the index nodes 531 will store the database structure itself, which may comprise, for example, a collection of indexes and other data for locating a particular piece of data on a storage drive in a node within the payload 402.

The blazing storage cluster 505 also comprises a high speed switch 503. Each blazing storage node 501 is operatively coupled to the high speed switch 503 through a high speed, RDMA capable link 508. Similarly each hot storage node 511 is coupled to a high speed switch 513 through a high speed, RDMA capable, link 508, and each warm storage node 521 is coupled to the high speed switch 523 through a high speed, RDMA capable, link 508. Similarly, the high speed switches 503,513,523 are coupled to each storage cluster 505,515,525, and are each coupled to the high speed switch 533 of the index cluster 535 by a high speed, RDMA capable, link 508.

In accordance with the present disclosure, the database system 112 implements various unique features to be extremely efficient for database reads. These features include, without limitations to, sequential writes of rows in a coding block, sequential writes of coding blocks within segments, random distribution of coding blocks among nodes within a cluster, massive parallel access between nodes, storage access software running within user space, data storage without conventional file systems, coding data alignment on page boundaries, high speed links between nodes within a cluster via switches, high speed links between clusters, and row numbers for fast determination of data location on physical disks. Moreover, the database system 112 implements various unique features to reduce cost of the storage devices of the database management system 108. For example, the database system 112 uses less storage space (meaning high disk space utilization) since it fits the maximum number of data rows in each coding block. Additionally, the hot cluster 505 utilizes NVME drives while the warm cluster 515 uses lower-cost SATA storage disks.

As an additional example, it utilizes lower cost storage devices for colder temperature clusters. Moreover, the database system 112 avoids overwrites and rewrites against storage devices supporting limited numbers of program/erase (P/E) cycles, such as NAND flash drives, that have low-endurance but are lower-cost.

The database system 112 is capable of managing a large volume of data, such as one quadrillion ($10^{15}$) rows of data. In one implementation, each row is of a fixed size of one hundred or fewer bytes of data. In one example of such a case, the database system 112 is capable of managing about one hundred Peta Bytes (PBs) of data. Data is grouped in segments with some fixed size. Each segment is assigned to exactly one node in exactly one coding cluster in the payload store 402. In such a case, a segment is the fundamental relocatable unit in the database system 112. Each unique segment is stored on exactly one storage disk, and multiple unique segments can be stored on a disk. Suppose that each storage drive has a storage capacity of 512 GBs, and a segment to be stored has a capacity of 128 GBs, the database system 112 then is capable of managing about 781,250 segments storing one quadrillion rows of data.

Figure 6:
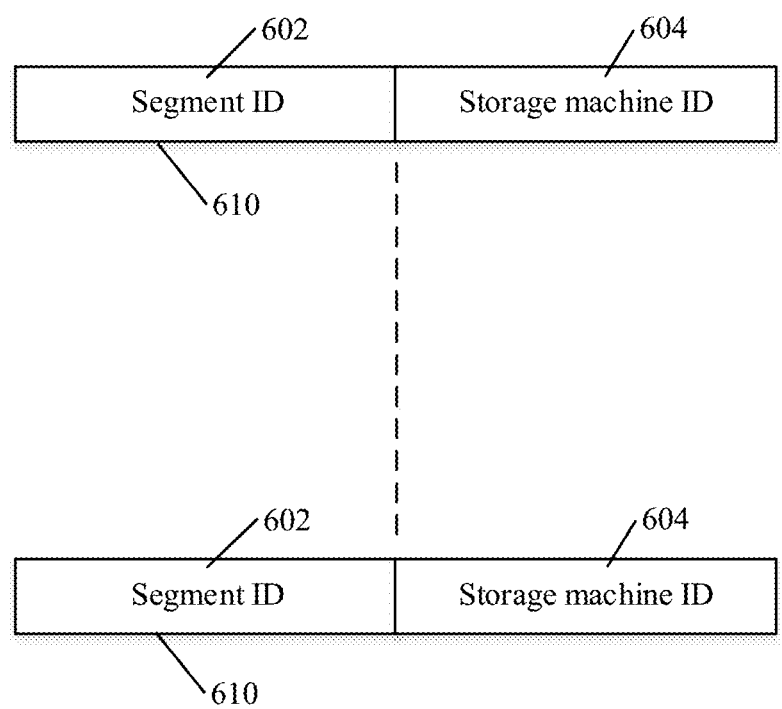
FIG. 6 is a simplified block diagram illustrating a routing table for routing between segment identifiers and storage devices in accordance with this disclosure.

Each cluster within the payload store 402 maintains a routing table providing a mapping between segment identifiers and storage drives. In one implementation, the routing table is maintained and stored locally by each node in a cluster that may need to access data, and consistently replicated between nodes in the cluster upon changes. An illustrative routing table is shown in FIG. 6 and generally indicated at 600. In the routing table 600, each entry 610 incudes a segment identifier (ID) 602 and disk ID 604. The segment ID 602 uniquely identifies a segment in the database system 112; and the storage disk ID 604 identifies a storage disk (also referred to herein as a storage machine). Each entry 610 is 128 bytes long in the illustrative implementation. In such a case, the size of the routing table 600 is about one hundred (100) MBs, which is maintained in memory (such as direct random access memory (DRAM)) for fast access.

Figure 7:
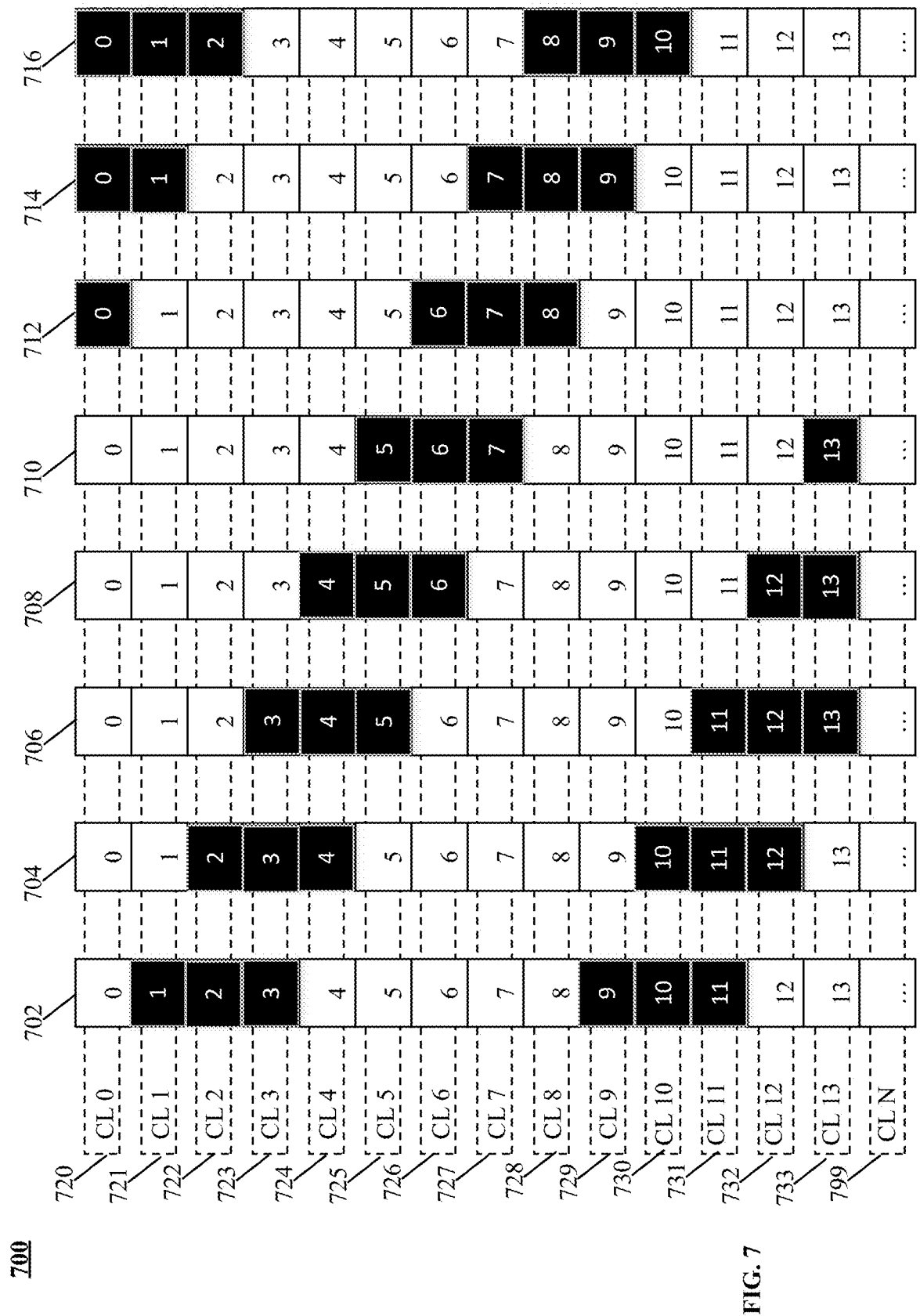
FIG. 7 is a simplified block diagram illustrating a segment group constructed in accordance with this disclosure.

In one illustrative embodiment of the database system 112, each cluster includes eight (8) storage disks, each on a separate node, and thus eight segments of data as shown in FIG. 7. The eight segments are indicated at 702-716 respectively and form a cluster 700. Each segment comprises of a set of consecutive coding blocks, such as the blocks labeled 0-13 and so on in the segment 702. To obtain the optimal performance in reading data from and writing data into coding blocks, the coding blocks are sized to match the page size of the storage drives 702-716. The coding blocks are each four kilobytes (4 KB) long when the page size is 4 KB. Physical access of storage devices is faster if an access is limited to one block.

Each line of coding blocks across the eight segments 702-716, such as the eight coding blocks labeled as 0, is termed herein as a coding line. The coding lines of the cluster 700 are indicated at 720-733 and 799 (meaning the rest blocks). To provide fault tolerance and redundancy for the database system 112, the cluster 700 uses parity information for data construction when one or more disks fail. In the illustrative cluster 700, the parity blocks storing parity information are indicated with black color, such as the coding blocks 0 in the segments 712-716.

Figure 8:
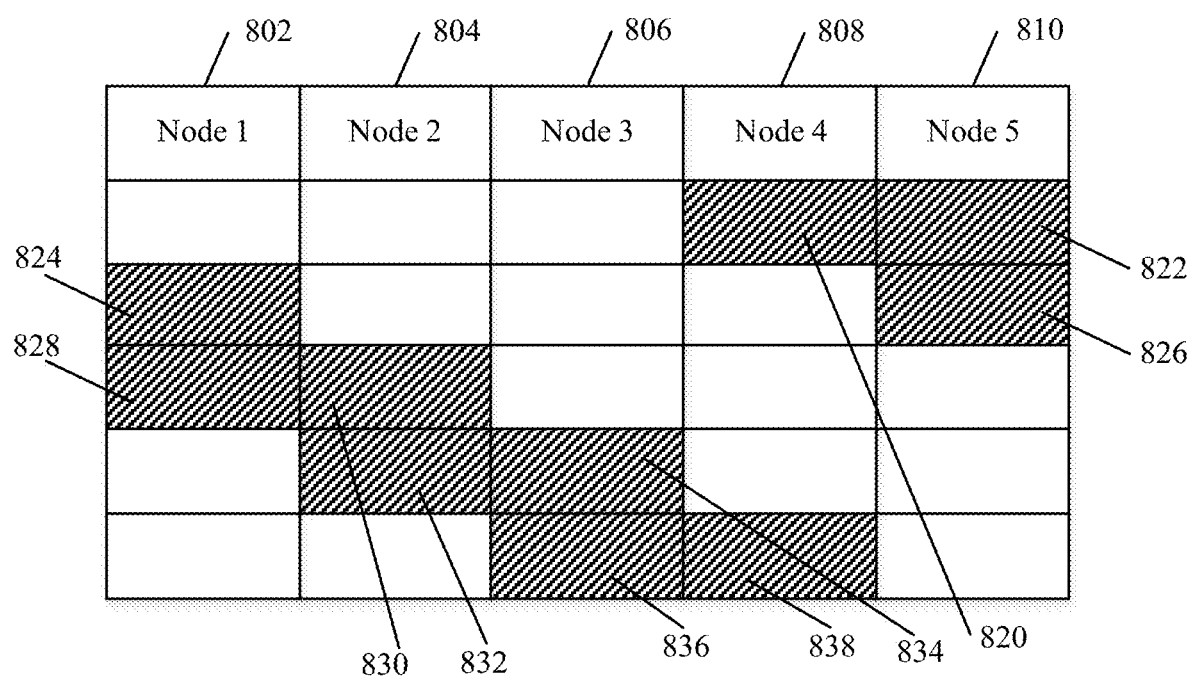
FIG. 8 is a simplified block diagram illustrating a segment group constructed in accordance with this disclosure.

Another illustrative cluster of the database system 112 is shown in FIG. 8 and generally indicated at 800. The cluster 800 includes five segments 802, 804, 806, 808 and 810, each of which includes one storage drive. The cluster 800 implements a P+Q parity encoding scheme for redundancy. For example, the coding blocks 820-838 store parity information while other coding blocks store data. It should be noted that the coding blocks store index data when the cluster 800 is an index cluster. In a different implementation, the cluster 800 implements Reed-Solomon coding for error correction.

Figure 9:
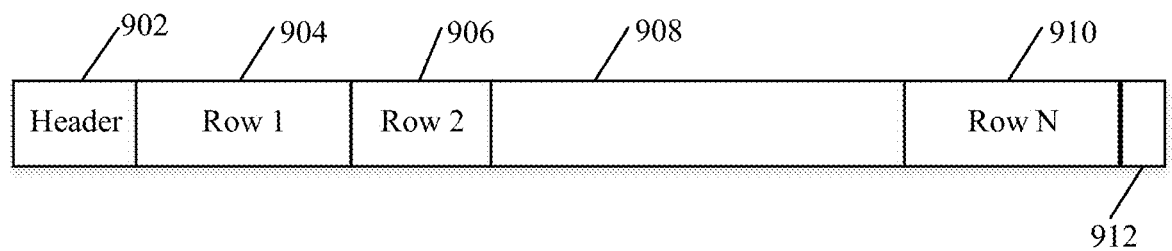
FIG. 9 is a simplified block diagram illustrating coding blocks constructed in accordance with this disclosure.

Each coding block contains a set of rows of data. An illustrative coding block is shown in FIG. 9 and generally indicated at 900. The coding block 900 includes a coding block header 902, which includes, without limitations to, a checksum of the bytes in the block (such as Cyclic Redundancy Check (CRC) 32), a row 904, a row 906, and so on. The last row in the coding block is indicated at 910. It should be noted that the sizes of the rows 904-910 may be of the same size or different sizes. In one embodiment, all rows are of the same size. The coding block 900 might have some unused space 912 at the end when, for example, the unused space 912 is smaller than the size of a row.

The database system 112 has a higher utilization of disk space than conventional systems because it packs multiple rows of data into each single coding block. For example, Bigtable is a sparse database system as shown in FIG. 2 and indicated in "Bigtable: A Distributed Storage System for Structured Data," Chang et al., Google, Inc., OSDI 2006, which is hereby incorporated by reference in its entirety. The efficient use of the storage systems saves cost and reduces the number of writes to the storage devices. Such reduction improves performance of the database system 112 and life expectancy of storage devices.

Each node maintains, in memory or Non-Volatile Random-Access Memory (NVRAM), such as Apache Pass storage, a list of open coding blocks for segments for which it is responsible. A coding block is said to be open when it is available to have rows appended into it, and as such, an in-memory copy of the data to be written is maintained. A database software application places incoming data into the open blocks. When a particular memory block is full, it is written to the correct associated physical storage block on the associated storage device. A memory coding block is said to be full and filled when its unused space is less than a predetermined size of memory. For example, the predetermined size of memory is the size of a row, such as 100 Bytes. The data write mechanism is further illustrated by reference to FIG. 10.

Figure 10:
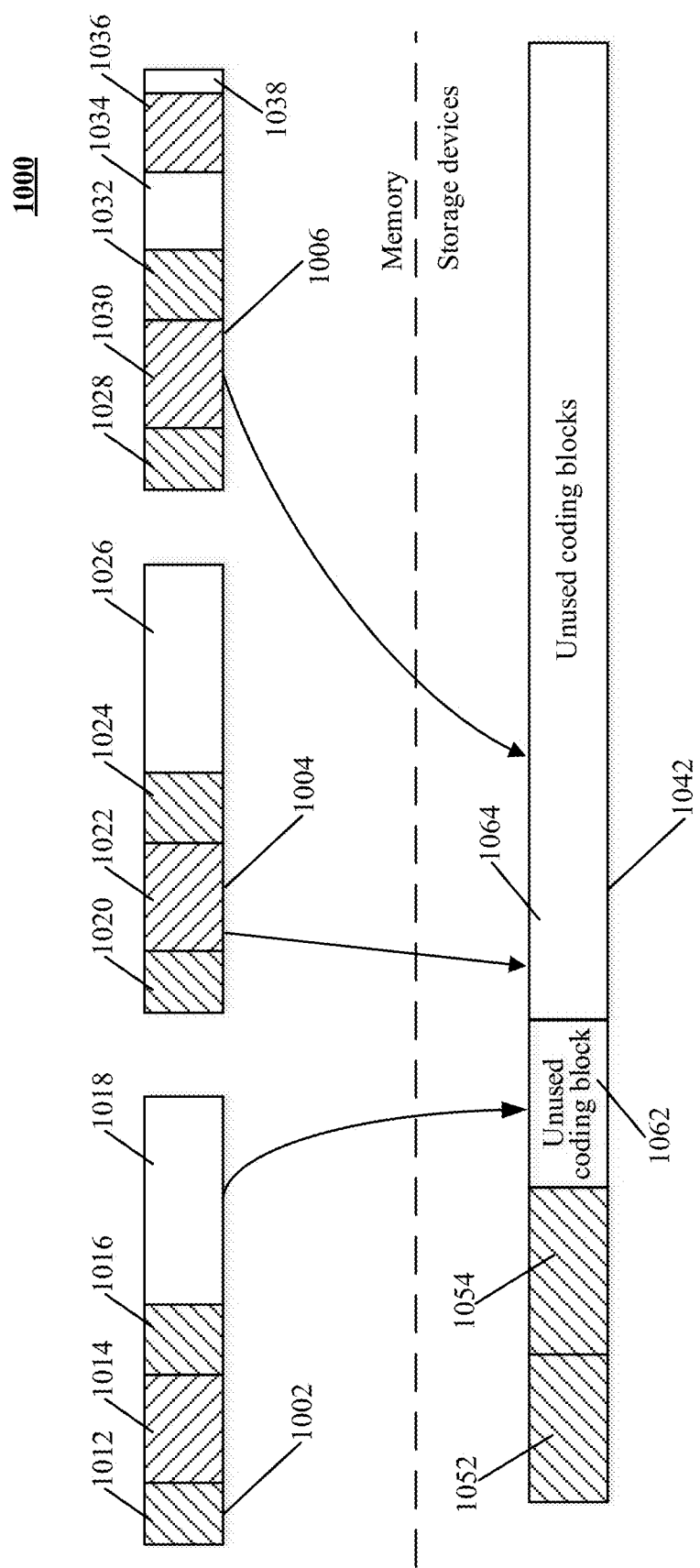
FIG. 10 is a simplified block diagram illustrating a random distribution of rows between a set of segments constructed in accordance with this disclosure.

Referring to FIG. 10, a simplified block diagram depicting a data writing architecture and method by which the database system 112 writes data into storage drives is shown and generally indicated at 1000. Each node (such as the nodes 501) in a cluster maintains and manages a set of open coding blocks for each segment assigned to the node. The open blocks of different nodes within a cluster correspond to a set of coding lines. In one implementation, the coding lines and the open blocks are controlled by a designated leader. A segment 1042 includes two coding blocks 1052 and 1054 that have been written with data, and unused (meaning available for storing data) blocks 1062 and 1064. Since coding blocks are sized in accordance with the page size of the underlying storage, the written blocks in the segment 1042 are therefore aligned on page boundary to improve both read and write performance of the database system 112. The reason is that accesses to a storage device is most efficient when data is aligned, such as alignment with page boundary. Coding blocks within segments are written sequentially and thus efficiently use the storage space of the underlying storage disk while minimizing rewrites to existing blocks.

Three memory blocks are indicated at 1002, 1004 and 1006. In one implementation, the memory blocks 1002-1006 are pinned memory buffer that allows Remote Direct Memory Access (RDMA) by other nodes in the same or different clusters, such as a node in the index store 404 or a different node in the same cluster. In one implementation, the list of open coding blocks (such as the blocks 1002-1006) are arranged and managed as a queue.

Each open coding block in memory is associated with a coding line and thus a fixed location within a segment. For example, the coding block 1002 can be associated with the coding line 720; the node maintaining the coding block 1002 can be the node 702. In such a case, the data rows of the coding block 1002 are written into the block 0 of the segment 702 after the coding block 1002 is full. The coding block 1002 in memory is said to be full and closed when no more data rows can be inserted into it. It is said to be open when one or more data rows can still be inserted into it. The coding block 0 is said to be open when the coding block 1002 in memory is not full. The coding block 0 is said to be close when the coding block 1002 in memory is full. The coding line 720 is said to be open if any of the coding blocks 0 in the coding line 720 is open. The coding line 720 is said to be closed when each data coding block 0 (i.e., the blocks 0 of the segments 702-710) in the coding line 720 is closed. Once the data rows in the coding block 1002 in memory is flushed to the coding block 0 of the storage segment 702, it is regarded as empty, and can be associated with another coding line, such as the coding line 731.

Taking the coding block memory 1002 as an example, it includes a header 1012, a data row 1014, a data row 106, and unused space 1018. The space 1018 is big enough to contain one or more rows of data. The coding block memory 1002 is thus not full yet. Taking the coding block memory 1006 as another example, it includes a header 1028, a data row 1030, a data row 1032, data rows 1034, a data row 1036, and an unused space 1038. The unused space 1038 is smaller than a predetermined size, such as a row size. Accordingly, the memory block 1006 is said to be full and filled.

Each coding block is associated with a particular segment, and written into the correct location within the associated segment when the coding block is full. For example, the coding blocks 1002-1006 are associated with and written into the segment 1042 when they are full. The location at which a coding block is written in a segment is illustrated in FIG. 7. For instance, the coding block 1002 is written into the block 8 of the segment 702 in the coding line 728. Full coding blocks are written into the correct location in their associated segment on disk. In one embodiment of the present disclosure, the result of sequentially writing arbitrary data rows into the available open blocks is an effectively random distribution of rows across multiple coding blocks. In such a case, when a group of data rows must be read, they can be read in parallel because they are likely to be present in separate coding blocks regardless of the specific grouping criteria. The random distribution of data rows within a set of coding blocks provides massively parallel access to the data, such as reads and updates.

Figure 11:
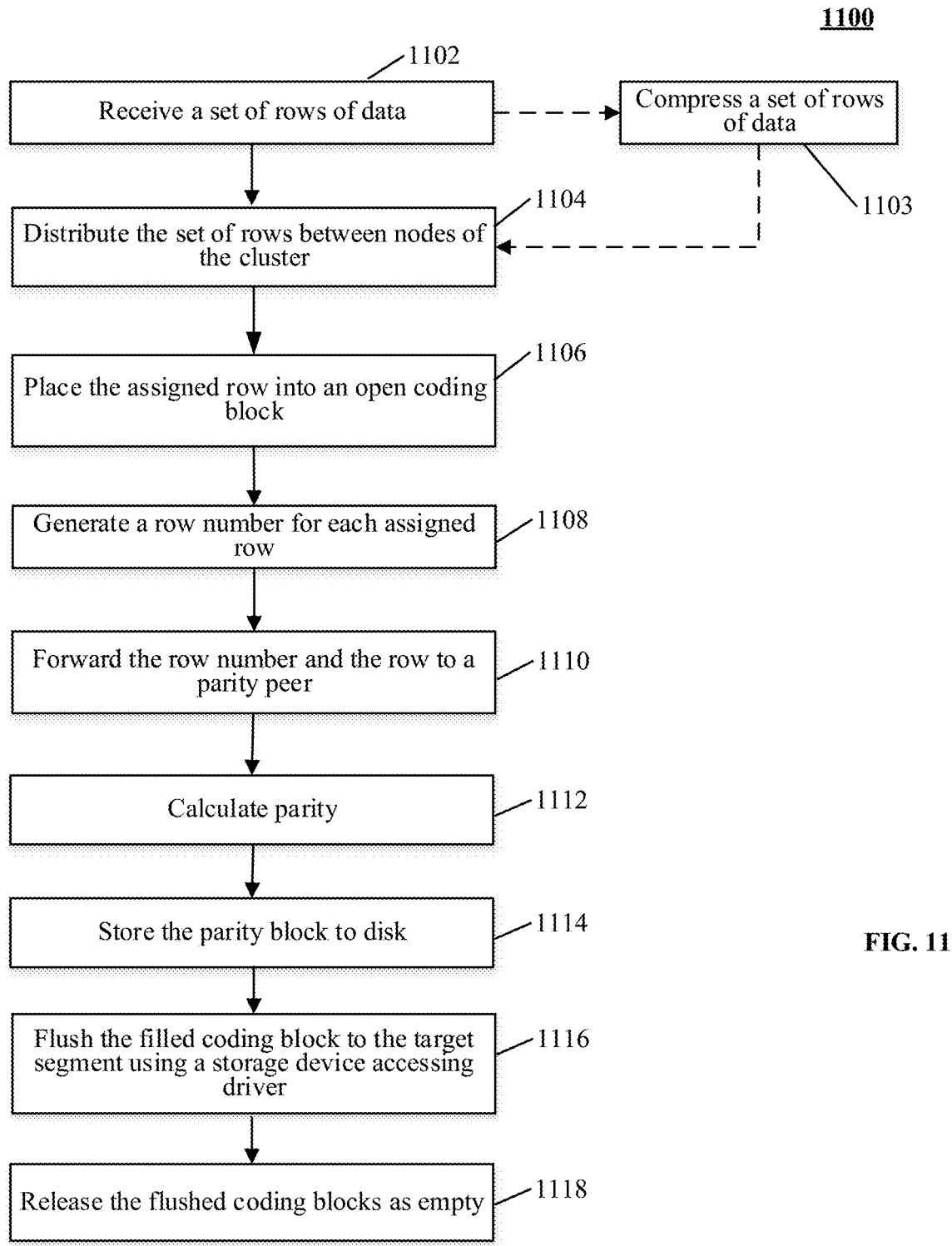
FIG. 11 is a flowchart depicting a process by which a database system writes data into cluster nodes in accordance with the teachings of this disclosure.

The data writing process is further illustrated by reference to FIG. 11. Referring now to FIG. 11, a flowchart depicting a process by which the database system 112 writes data into cluster nodes is shown and generally indicated at 1100. The data is written into the database system 112 as data rows. In one implementation, the rows are randomly distributed between nodes within a cluster (such as the cluster 505) by a computer software application running on, for example, the computer 598 shown in FIG. 5. The computer software application is thus termed herein as a row distributor.

At 1102, the database system 112 receives some amount of data for writing into the database 112. The received data is split into a set of data rows. The received set (meaning one or more) of rows of data is originated from computers, such as the client computers 102-104 and the third-party server 106. In a further implementation, the received data is compressed at 1103. The compression reduces the use of storage space. In one implementation, the row distributor splits the received data into the set of rows and compresses the data. At 1104, the row distributor distributes the set of rows between nodes of a cluster. For example, the set of rows are evenly distributed between the nodes when each node includes only one segment. For instance, each node receives two consecutive rows when the set of rows includes ten rows and there are five single segment nodes in the cluster. In such a case, the two rows are said to be assigned to the corresponding node. The distribution of the set of rows between the nodes is also random. For a particular data row, the node within the cluster it is assigned and written to is selected randomly.

At 1106, each node places each of its assigned rows into an open coding block. Each row is placed in exactly one coding block. The in-memory version of a block is directly tied to the storage disk to which the block will eventually be flushed. Rows are copied to parity peers over the network. For example, the data row 1016 is placed into the illustrative open coding block 1002, which is to be written into the illustrative block 10 of the segment 706 in the coding line 730, where the segment 706 belongs to a node within a cluster. As an additional example, suppose there are twenty four rows and three open coding blocks, the first eight rows are then written in the first open coding block, the second eight rows are written in the second open coding block, and the remaining eight rows are written into the third open coding block. Each of the three coding blocks contains a set of consecutive rows. The sequential placement of rows in the open memory blocks means sequential write of the rows into storage devices and segments. The sequential writes reduce rewrites on the storage devices due to write amplification and SSD garbage collection, allowing the usage of low-endurance SSDs in the database system 112.

After a row is placed in an open coding block, the coding line, the segment and the segment group information of the row 1016 is known. Accordingly, at 1108, a row number for each assigned row is generated. In one implementation, the row number is generated by each node. The row number uniquely identifies the location of the row of data within the database system 112. Furthermore, at 1108, a header of each open coding block is updated to indicate the row written into the block. For example, a CRC32 checksum of the row is updated in the header.

At 1110, the node forwards the generated row number and the assigned row to its parity peers. For instance, suppose that the open coding block containing the assigned row is to be written into the coding block 11 the segment 708 in the coding line 713, the row number and the assigned row are then forward to the nodes of the segments 702, 704 and 706 over a direct network link, such as the HSI link 508.

At 1112, when all the open coding blocks for a given coding line become full, each parity node calculates parity. For example, for the coding line 729, when all the open coding blocks to be written into the data blocks 9 of the segments 704-712, the parity nodes 702 and 714-716 for the coding line 729 calculate parity. The initiation of the parity calculation is further illustrated by reference FIG. 21.

Figure 21:
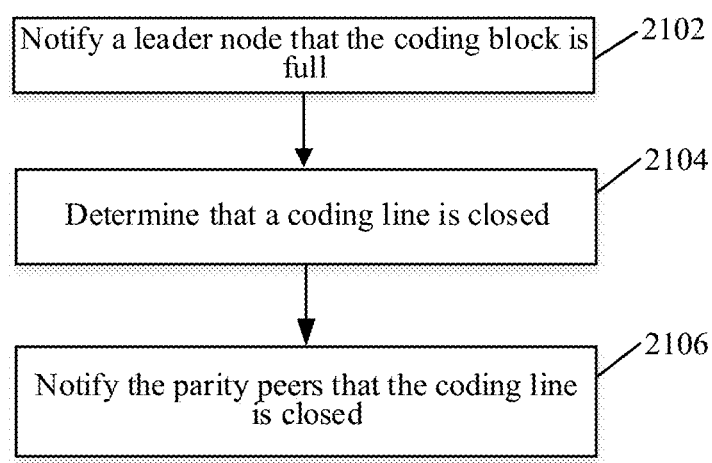
FIG. 21 is a flowchart depicting a process by which a cluster initiates parity calculation in accordance with the teachings of this disclosure.

Referring to FIG. 21, a flowchart depicting a process by which a cluster initiates parity calculation is shown and generally indicated at 2100. At 2100, a node notifies a designated leader node that a coding block of a particular coding line is full. The leader node can be one of the nodes of the cluster, and selected based on a protocol. At 2104, the leader node determines that each data block in the coding line is closed. At 2106, the leader node notifies each parity node of the coding line that the coding line is closed. In response, at 1110, each parity peer within the cluster calculates parity.

Turning back to FIG. 11, at 1114, each parity node for the coding line stores the parity block to physical disk. The parity block is also said to be flushed into disk. Furthermore, at 1116, each data node of the coding line writes its corresponding coding block of data into disk using a storage device accessing driver running in user mode, not kernel mode. In one implementation, a data node flushes a full coding block to a disk and notifies the leader node without waiting for other coding blocks within the same coding line. In other words, the coding blocks of data of a coding line may be flushed to disks by respective nodes at different times. When all the blocks of a coding lines are flushed, the coding line is said to be flushed and written into physical disk. Coding lines are thus opened and flushed in sequence by a cluster. Accordingly, the database system 112 sequentially writes coding blocks into storage disks.

Furthermore, the data writing of the process 1100 does not rely on or use a file system (such as NTFS file system or Google File System that Google Bigtable relies on) on the nodes. The data writing using storage device accessing drivers running in application mode, not kernel mode, without going through file systems significantly reduces data writing time. At 1118, the flushed coding blocks (such as the coding block 1002 in memory) are then marked as empty. For instance, when the coding block 1002 is returned to a queue of available open blocks, it is said to be marked as empty.

As a result of the process 1100, the distribution (or insertion) of one row to a node is not related to the distribution of another row to the same node or a different node within a cluster. Accordingly, read queries for data rows at a future time results in the reading of a random set of coding blocks from a set of storage disks. In other words, the random distribution of rows to different segments allows for uniform parallel read access to the stored rows. The massive parallel read access is also extremely efficient due to the fact that disks, such as SSDs, maintain high read rates with random access.

Figure 19:
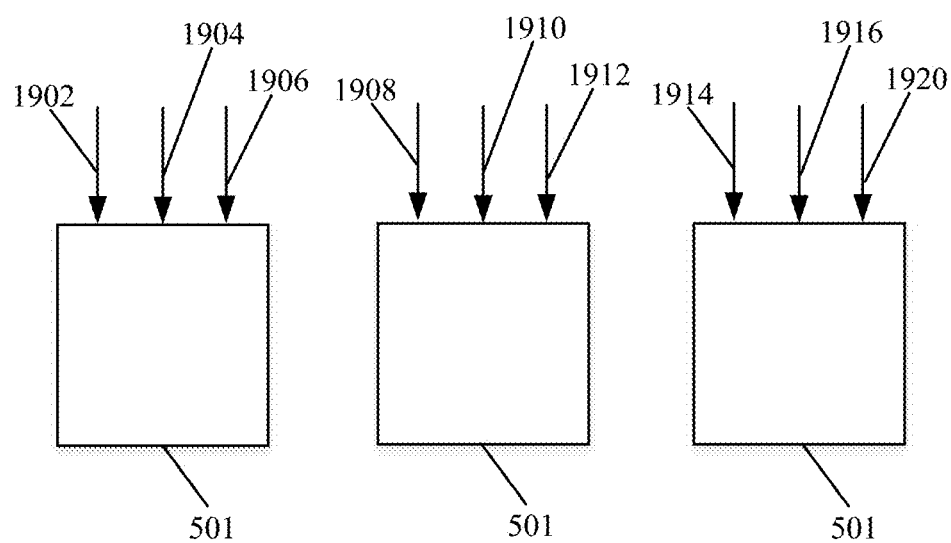
FIG. 19 is a simplified block diagram depicting massive parallel writes in accordance with the teachings of this disclosure.

Referring now to FIG. 19, multiple writes 1902-1920 are performed on storage drives 501 in parallel at the same time. Furthermore, multiple writes (such as 1902-1906) are performed on a single segment 501 in parallel at the same time. With the massive parallel writing access to the storage disk drives, such as SSD disks, the database system 112 fully utilizes concurrent access capabilities of the storage disks. Turning back to FIG. 11, at 1116, each filled memory block that has been successfully written into target segments is released and indicated as empty. For example, it is placed at end of a queue. It should be noted that the parity information of each filled coding block is also written into parity blocks of parity peer segments.

Figure 12:
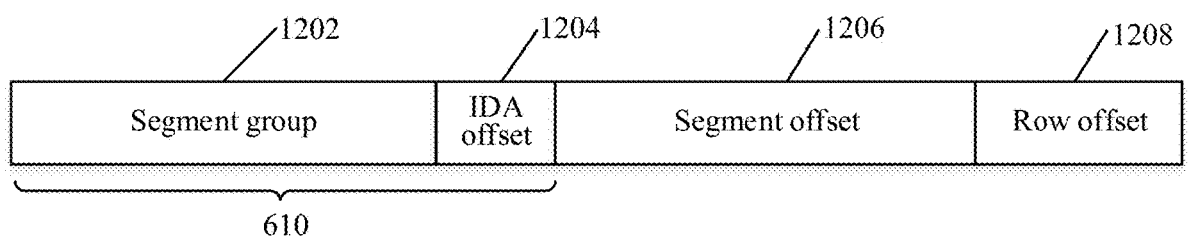
FIG. 12 is a simplified block diagram illustrating a row number in accordance with the teachings of this disclosure.

The row numbers are further illustrated by reference to FIG. 12. Referring to FIG. 12, a block diagram depicting a row number is shown and generally indicated at 1200. The row number 1200 includes a segment group 1202, an Information Dispersal Algorithm (IDA) offset 1204, a segment offset 1206 and a row offset 1208. The row number 1200 uniquely identifies the location of a row of data within the database system 112. In one implementation, the row number 1200 is a sixty-four (64) bit number. For example, the segment group 1202 has twenty-two (22) bits; the IDA offset 1204 is zero-based and has five (5) bits; the segment offset 1206 has twenty-four (24) bits; and the row offset 1208 has thirteen (13) bits. In alternate embodiments, the row number 1200 can be, for instance, one hundred twenty eight (128) bits long. The elements 1202-1208 may also be of different lengths. For instance, the segment group 1202 can be twenty-four bits long.

The segment group 1202 uniquely identifies a segment group, and the IDA offset 1204 uniquely identifies a segment within the segment group. When the IDA offset 1204 is five bits long, each segment group includes from one to thirty two nodes. In one implementation, each segment group is a cluster and the cluster includes five nodes that form, for example, a RAID (meaning Redundant Array of Independent Disks) 6 structure. The IDA offset 1204 uniquely identifies a segment within the segment group 1202. When each node includes exactly one storage disk, the IDA offset 1204 then uniquely identifies a node within the segment group 1202. The combination of the segment group 1202 and the IDA offset uniquely identifies a segment within the database system 112, and is thus termed herein as a segment ID.

The segment offset 1206 is the location (from the beginning of the segment) of a coding block containing a particular row. The row offset 1208 is the location of the row of data within the coding block. When the rows are of a fixed size (such as 100 Bytes), the row offset 1208 and the fixed size identify the beginning and end of the row within the coding block.

The RAID 6 architecture utilizes two parity schemes. The parity information is striped across the five storage nodes. The parity allows the segment group continue to function properly even if two of the five storage nodes fail simultaneously. The functions include constructing a missing block of data on one failed storage node from parity information stored on other storage nodes. An illustrative diagram of the RAID 6 architecture is illustrated in FIG. 8. The five storage nodes are indicated at 802,804,806,808 and 810 respectively. Parity information is stored in parity blocks 822-838.

Figure 13:
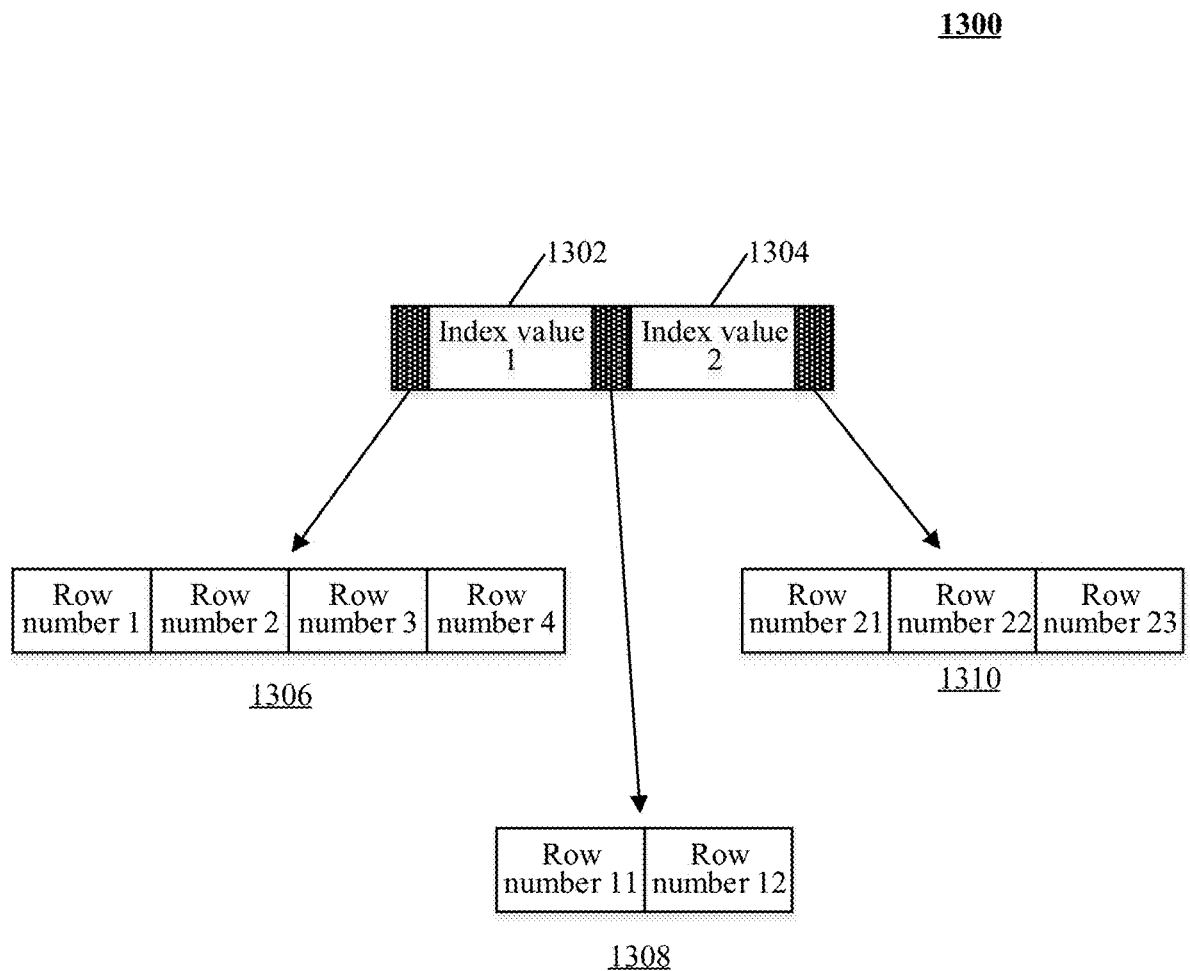
FIG. 13 is a simplified diagram depicting an index structure in accordance with the teachings of this disclosure.

The database system 112 further generates and maintains indexes for rows of data stored in segments within the system 112. The indexes support extremely low latency data queries. Each index value maps to a set of row numbers. The set of row numbers includes one or more row numbers. The indexes are structured for fast search. In one implementation, the index structure is a B+ tree that is balanced and associated with a short search time. An illustrative index B+ tree is shown in FIG. 13 and generally indicated at 1300. The illustrative index structure 1300 includes two index values 1302 and 1304, and three groups of leaf values indicated at 1306, 1308 and 1310 respectively. The leaf values are row numbers of rows of data stored in the database system 112.

The index store 404 manages and maintains the index structure 1300. The indexes 1302-1304 and the leaves 1306-1310 are stored in nodes, such as the nodes 531. In one implementation, the leaves 1306-1310 are stored in low-cost disks, such as solid state drives (SSDs), with low endurance, while the index values 1302-1304 are stored in high endurance storage. The high endurance storage (such as, for example, DRAM memory, FLASH memory and NVME) allows the index values to be written more often. The leaf nodes of the index structures are mostly appended. Accordingly, they are stored in low endurance storage devices to reduce cost.

Figure 14:
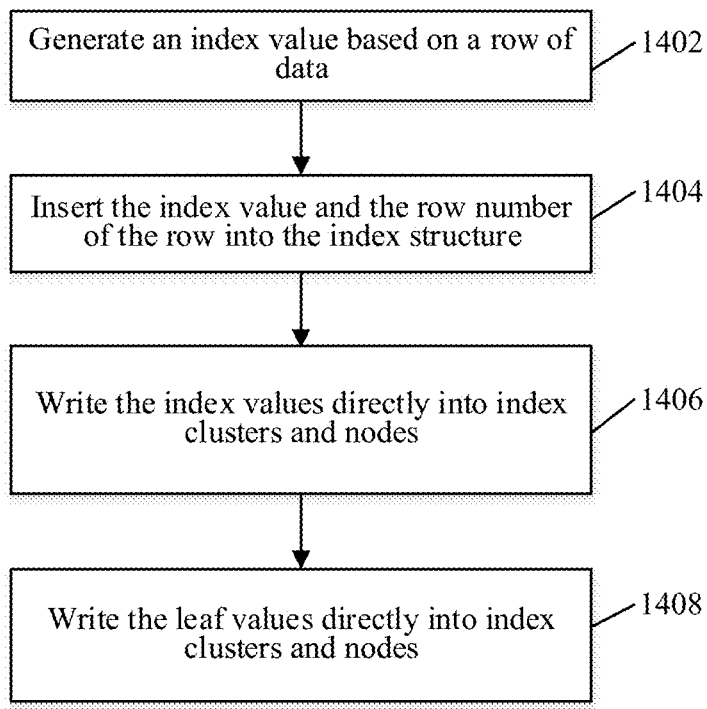
FIG. 14 is a flowchart depicting a process by which a database system processes indexes in accordance with the teachings of this disclosure.

The index processing of the database system 112 is further illustrated by reference to FIG. 14. Referring to FIG. 14, a flowchart depicting a process by which the database system 112 manages indexes is shown and generally indicated at 1400. At 1402, a computer software application running in the index store 404 operates on a row of data to generate an index value. The computer software application runs on, for example, a transaction coordinator that manages writing to the index store 404 and the payload store 402. In one implementation, the software application operates on the row of data (such as the rows 1012-1036) using RDMA mechanism over HSI links (such as the link 508) to generate the index value. At 1404, the software application inserts the index value and the row number of the row into the index structure, such as the index tree 1300.

At 1406, the software application writes the index values of the index structure directly into segments of clusters within the index store 404 using, for example, a storage driver. The write operation does not involve or use a file system. Instead, the driver runs in user mode and directly accesses the storage device for writing data. In one implementation, the index values are written into storage disks of high endurance tolerating many writes.

At 1408, the software application writes the leaf values of the index structure directly into segments of clusters within the index store 404 using, for example, a storage driver. The write operation does not involve or use a file system. Instead, the driver runs in user mode and directly accesses the storage device for writing data. In one implementation, the index values are written into storage disks of high endurance tolerating many writes. Furthermore, the leaves are grouped by segment ID when they are written to storage devices. The grouping of leaf data by segments allows sequential write of the leaves into storage devices. The sequential write ensures minimal rewrites due to write amplification and SSD garbage collection, allowing for the utilization of low-cost, low-endurance storage devices for the bulk of the required storage.

Figure 15:
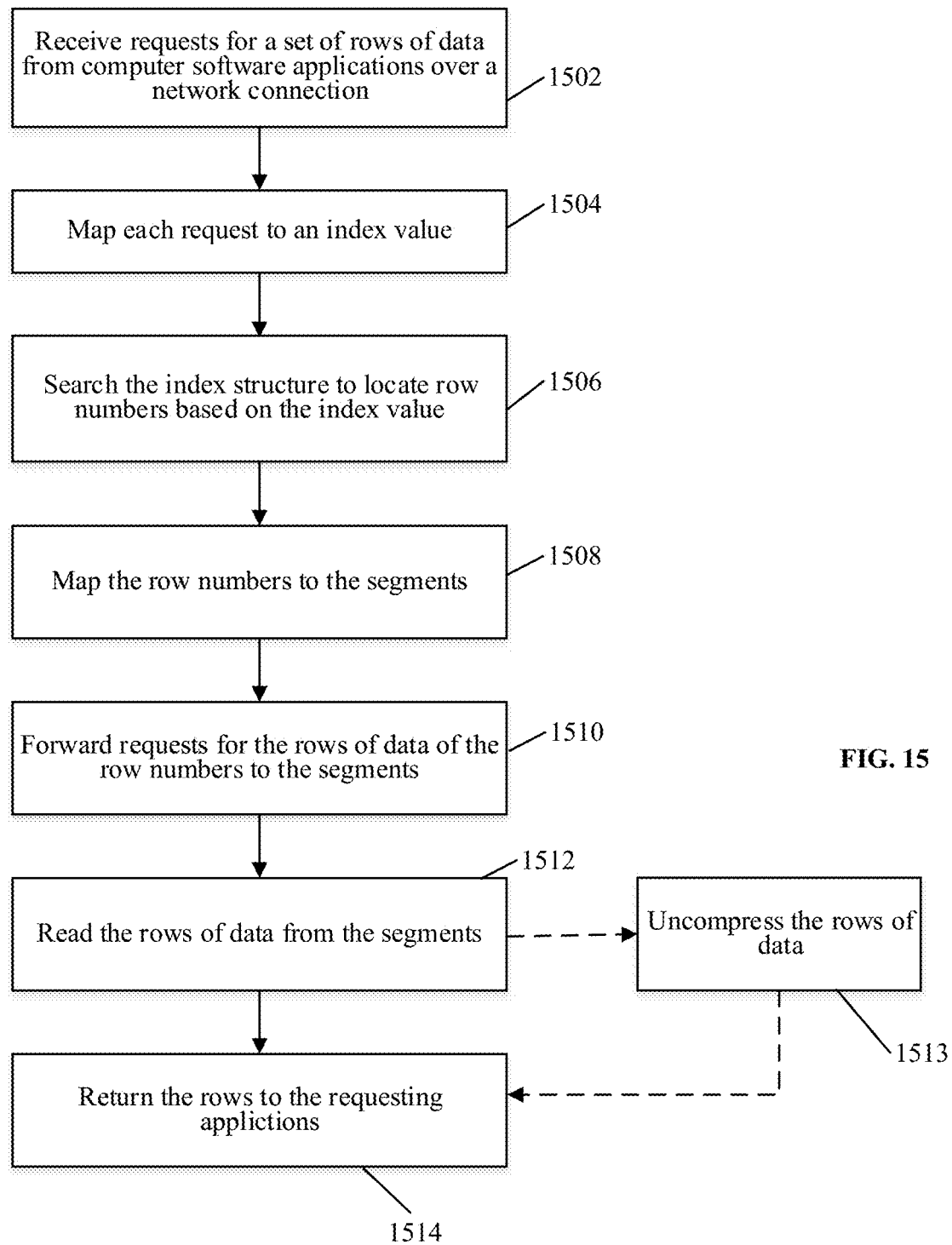
FIG. 15 is a flowchart depicting a process by which a database system serves data to applications in accordance with the teachings of this disclosure.

Referring to FIG. 15, a flowchart depicting a process by which the database system 112 handles data queries, such as requests for rows of data, is shown and generally indicated at 1500. At 1502, a set of requests for a set of rows of data are received from computer software applications running on, for example, the client computers 102-104. At 1504, each data request (such as a query) is mapped to a set (meaning one or more) of index values. It should be noted that multiple index values may be mapped to by a single request. At 1506, the index structure is searched to locate the row numbers corresponding to the index values identified at 1504. At 1508, the row numbers are used to identify the specific segments containing the rows of data. For example, the routing table 600 is searched to locate the segments based on the segment groups and IDA offsets of the row numbers. At 1510, requests for the rows of the data corresponding to the row numbers are sent to the nodes of the identified mapped segments.

At 1512, the nodes receive the requests, and call storage device drivers to directly read the requested rows from the segments. The nodes can be in different clusters of the same or different temperatures. For example, the nodes can include some nodes 501, some nodes 511, and/or some nodes 521. When a row is read from a segment, the entire coding block containing the row is read. Accordingly, only one read is performed when multiple rows in the same block are requested. Furthermore, the read operation performed by the different nodes are in parallel. In addition, the rows of data are distributed between different coding blocks, in different segments because there is no relationship between rows stored in a given block. The random distribution thus leads to the massive parallelism in read operation. When the rows of data are compressed data, at 1513, the rows of data are uncompressed.

Figure 20:
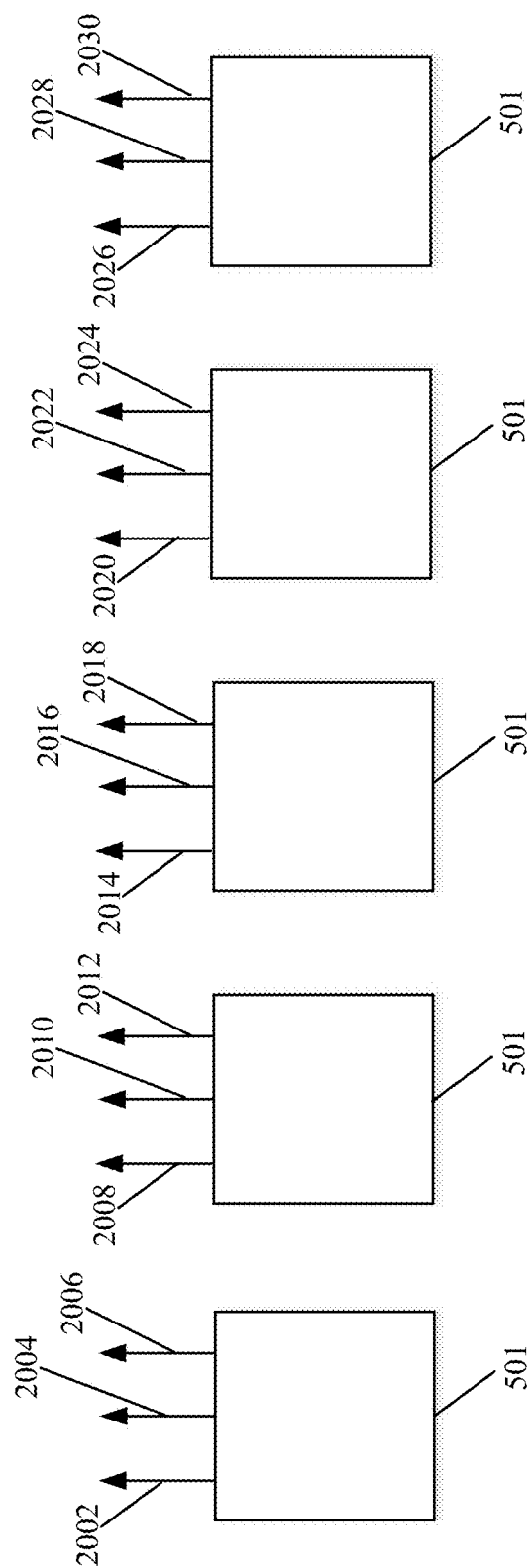
FIG. 20 is a simplified block diagram depicting massive parallel reads in accordance with the teachings of this disclosure.

As shown in FIG. 20, the reads at 1512 are massive parallel accesses to the nodes of the data segments. For example, multiple reads 2002-2030 are concurrently performed against the nodes 501 (such as SSD drives). Furthermore, multiple reads (such as the reads 2002-2006) are performed on a node's segment 501 at the same time. The massively parallel reads 2002-2030 allows the database system 112 to optimize storage disk drive access and system performance.

Figure 16A:
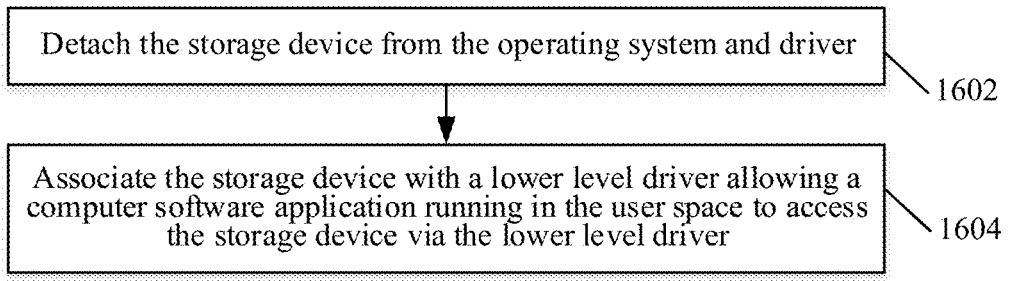
FIG. 16A is a flowchart depicting a process by which a cluster node in a database system associates with a storage device driver in accordance with the teachings of this disclosure.
Figure 16B:
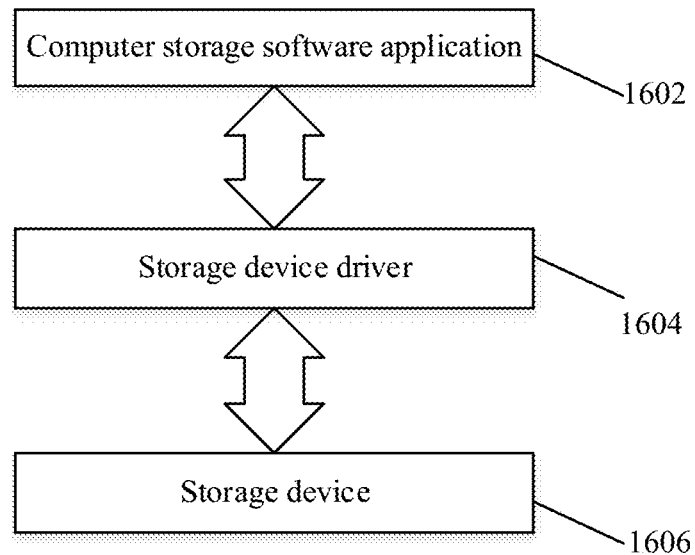
FIG. 16B is a simplified block diagram of a database system in accordance with the teachings of this disclosure.

Turning back to FIG. 15, at 1514, the rows of data are returned to users. The storage drivers the nodes and clusters use to directly access the storage device are first associated with the computer software applications running in the database system 112. The process of association is further illustrated by reference to FIGS. 16A and 16B. Turning first to FIG. 16A, a flowchart depicting a process by which software applications running on nodes within the database system 112 is associated with the storage device drivers is shown and generally indicated at 1600. At 1602, the software application detaches the storage device from the operating system, such as Linux operating system.

At 1604, the software application associates itself with a lower level storage device driver for directly accessing the storage device. In such a case, both the software application and the lower level driver run in user mode, instead of kernel mode. When both run in user mode, operations on the storage device avoids the mode switch between the user mode and kernel mode of the computer operating system, and thus improves the performance of the database system 112. Furthermore, in one implementation, the software application is written in computer software programming language C++ for the sake of achieving better performance. The lower level driver is capable of controlling a storage device controller to read data from and write data into particular physical locations of the storage device.

Furthermore, this association allows the database system 112 to avoid relying on a file system, such as file systems provided by operating systems. In such a case, the software application directly reads data from the disks and writes data into the disks. The association and architecture are further depicted in FIG. 16B with the lower level device driver indicated at 1604.

The database system 112 supports different storage temperatures, such as blazing, hot, warm and cold. In one implementation, the blazing storage comprises DRAM and FLASH memory; the hot storage comprises NVME drives; the warm storage comprises SATA SSD drives; and the cold storage comprises archival storage systems, such as that provided by Cleversafe.com. Data is copied from one temperature to another. The data transition between the temperatures is further illustrated by reference to FIG. 17.

Figure 17:
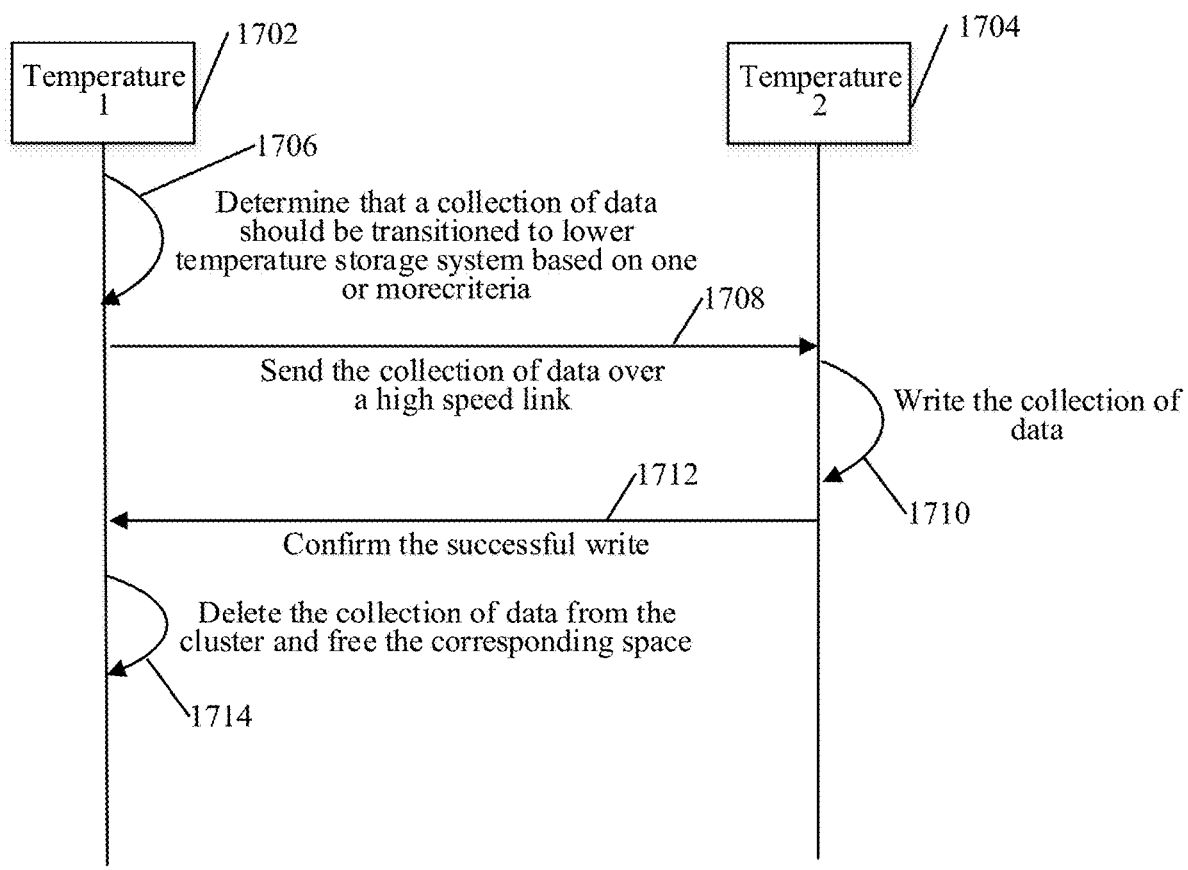
FIG. 17 is a sequence diagram depicting a process by which a database system transitions data between different temperatures in accordance with the teachings of this disclosure.

Referring to FIG. 17, a sequence diagram depicting the process by which data is transitioned from one storage temperature to another is shown and generally indicated at 1700. At 1706, a software application, running on a node within the payload store, determines that a collection of data, such one or more segments, should be moved to a lower temperature storage system based on one or more criteria. For example, one criterion is the age of the collection of data. The age is measured from the time the data is stored in the current temperature storage. When the life is over a predetermined time threshold, such as five days or five months, the data is then transitioned out. As an additional example, one criterion is Least Recently Used (LRU) criterion. Periodically, least recently used collection (such as collection that are least recently read) of data are transitioned to a lower temperature storage system. The criteria can also be based on the data access patterns by, for example, counting the density of reads over time. In such a case, data is moved to a lower temperature on a periodic basis based upon how frequently a segment has been accessed.

In one implementation, the transitioning unit of data is a segment group when moving data between temperatures. In such a case, the unit of the collection data is a segment group; and data in the entire group is copied to a lower temperature. When the data of a segment group of a higher temperature is transitioned to another segment group of a lower temperature, the pairs of nodes of the two segment groups operate in parallel. Each pair consists of a source node having a segment of the segment group of the higher temperature, and a destination node having a segment of the segment group of the higher temperature. The source node sends data stored on its segment to the destination node, which stores the received data into a segment on the destination node. The destination node then notifies the source node that the data writing is done. The source node receives the notification and deletes the data from its segment of storage to free space for storing new data. The data transition is parallel between the pairs. The corresponding routing table is also updated in all nodes of the group to indicate that the new set of nodes, storing the transitioned segment group of data in the lower temperature cluster, now owns the transitioned segment group.

At 1708, the collection of data (such as a segment group of data) is forwarded to the lower temperature storage 1704 from the present temperature storage 1702. At 1710, the collection of data is written into the temperature storage 1704. At 1712, the confirmation of successful write is sent to the temperature storage 1702. At 1714, the collection of data is deleted from the temperature storage 1702. Accordingly, the temperature storage 1702 frees the storage space occupied by the deleted data.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A payload store within a database management system, the payload store comprising:
a set of coding clusters, wherein a first coding cluster of the set of coding clusters includes a first set of nodes and a second coding cluster of the set of coding clusters includes a second set of nodes, wherein the first set of nodes and the second set of nodes have an equal number of nodes, and wherein a first node of the first set of nodes includes:
a memory;
a network interface;
a storage device; and
a processing unit operatively coupled to the memory, the network interface, and the storage device,
wherein the processing unit is operable to:
receive, via the network interface, a first portion of data, wherein the first portion is to be stored in storage devices of the first coding cluster;
split the first portion into a first set of data rows, wherein the first set of data rows includes a plurality of subsets of data rows and a last subset of data rows; and
randomly assign the plurality of subsets of data rows and the last subset of data rows between the first set of nodes, wherein a first number of data rows of the plurality of subsets of data rows is assigned to the first node and a second number of data rows of the plurality of subsets of data rows is assigned to a second node of the first set of nodes, and wherein the first number and the second number are equal;
store, by the first node, the first number of data rows in the storage device;
send, via the network interface, the second number of data rows to the second node for storage therein; and
send, by the first node and via the network interface, the first and second number of data rows to a parity node of the first set of nodes, wherein the parity node is operable to calculate parity information for the first and second number of data rows, and wherein the parity node stores the parity information in a storage device of the parity node.

2. The payload store of claim 1, wherein the processing unit is further operable to:
compress the first portion of data to produce a compressed first portion; and
split the compressed first portion into the first set of data rows.

3. The payload store of claim 1, wherein each subset of the plurality of subsets of data rows has a first size and the last subset of data rows has a size that is equal to or less than the first size.

4. The payload store of claim 1, wherein a third node of the second set of nodes includes:
a second memory;
a second network interface;
a second storage device; and
a second processing unit operatively coupled to the second memory, the second network interface, and the second storage device, wherein the second processing unit is operable to:
receive, via the second network interface, a second portion of the data, wherein the second portion is to be stored in second storage devices of the second coding cluster;
split the second portion of the data into a second set of data rows;
randomly assign the second set of data rows between the second set of nodes, wherein a third number of data rows of the second set of data rows are assigned to the third node; and
store, by the second node, the third number of data rows.

5. The payload store of claim 1, wherein processing unit is further operable to randomly assign the plurality of subsets of data rows and the last subset of data rows by:
randomly assigning a third number of data rows of the first set of data rows to a third node of the first set of nodes, wherein the third number of data rows includes the last subset of data rows of the first set of data rows, and wherein the third number is equal to or less than the first and second numbers.

6. The payload store of claim 1, wherein the second node of the first set of nodes includes:
a second memory;
a second network interface;
a second storage device; and
a second processing unit operatively coupled to the second memory, the second network interface, and the second storage device, wherein the second processing unit is operable to:
receive, via the second network interface, the second number of data rows from the first node; and
store the second number of data rows in the second storage device.

* * * * *